United States Patent
Kou et al.

(10) Patent No.: US 9,766,637 B2
(45) Date of Patent: Sep. 19, 2017

(54) OPERATION CONTROL SYSTEM FOR MINING MACHINE AND OPERATION CONTROL METHOD FOR MINING MACHINE

(71) Applicant: Komatsu Ltd., Tokyo (JP)

(72) Inventors: Ryuuen Kou, Hiratsuka (JP); Masanori Tojima, Fujisawa (JP); Tomonori Ozaki, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 27 days.

(21) Appl. No.: 14/362,714

(22) PCT Filed: Nov. 14, 2012

(86) PCT No.: PCT/JP2012/079550
§ 371 (c)(1),
(2) Date: Jun. 4, 2014

(87) PCT Pub. No.: WO2013/136588
PCT Pub. Date: Sep. 19, 2013

(65) Prior Publication Data
US 2014/0358382 A1 Dec. 4, 2014

(30) Foreign Application Priority Data

Mar. 15, 2012 (JP) ................................ 2012-059427

(51) Int. Cl.
*G05D 13/00* (2006.01)
*B60K 31/00* (2006.01)
(Continued)

(52) U.S. Cl.
CPC ............. *G05D 13/00* (2013.01); *B60K 31/00* (2013.01); *E21C 47/00* (2013.01); *E21F 17/18* (2013.01);
(Continued)

(58) Field of Classification Search
CPC .......... G08G 1/20; E21C 47/00; G05D 13/00; G05D 1/02
See application file for complete search history.

(56) References Cited

U.S. PATENT DOCUMENTS 5,657,226 A * 8/1997 Shin .................... B60K 31/0008
180/167
6,141,613 A * 10/2000 Fan ....................... B60K 41/242
180/6.7

(Continued)

FOREIGN PATENT DOCUMENTS

CN 1384448 A 12/2002
CN 101620786 A 1/2010
(Continued)

OTHER PUBLICATIONS

International Search Report dated Dec. 25, 2012, issued for PCT/JP2012/079550.

*Primary Examiner* — Basil T Jos
(74) *Attorney, Agent, or Firm* — Locke Lord LLP

(57) ABSTRACT

An operation control system for a mining machine includes, based on travel path information including at least information on moisture content of a travel path on which a mining machine operating at a mine runs, and position information being information on a position of a travel path corresponding to the travel path information, generating speed limit information for changing a speed limit for the mining machine to run on the travel path corresponding to the travel path information.

17 Claims, 9 Drawing Sheets

(51) Int. Cl.
  *E21C 47/00*    (2006.01)
  *G05D 1/00*     (2006.01)
  *E21F 17/18*    (2006.01)

(52) U.S. Cl.
  CPC ..... *G05D 1/0055* (2013.01); *G05D 2201/021* (2013.01)

(56) References Cited

U.S. PATENT DOCUMENTS

| | | |
|---|---|---|
| 6,480,769 B1 | 11/2002 | Kageyama |
| 2008/0208393 A1* | 8/2008 | Schricker ........................ 701/1 |
| 2013/0060458 A1* | 3/2013 | Makela et al. ................ 701/301 |

FOREIGN PATENT DOCUMENTS

| | | |
|---|---|---|
| CN | 102094397 A | 6/2011 |
| CN | 102285363 A | 12/2011 |
| JP | 06-080046 A | 3/1994 |
| JP | 11-249740 A | 9/1999 |
| JP | 2001-109519 A | 4/2001 |
| JP | 2007-323675 A | 12/2007 |

* cited by examiner

OPERATION CONTROL SYSTEM FOR MINING MACHINE AND OPERATION CONTROL METHOD FOR MINING MACHINE

FIELD

The present invention relates to a system and a method for controlling the operations of mining machines.

BACKGROUND

Vehicles such as various construction machines and mining machines, for example, excavators and dump trucks, operate at civil engineering work sites or workings of mines. There is a technology for causing a vehicle to run at such a working by setting travel conditions of a travel path on which the vehicle runs at a monitoring station, and giving a travel instruction in accordance with the travel conditions from the monitoring station to the vehicle. The travel instruction is to instruct the vehicle to run at a predetermined speed limit in a section of a certain travel path, to instruct the vehicle such that the vehicle decelerates to run in a section of a certain travel path, to instruct the vehicle to stop at a point on a certain travel path, and the like. As a technology for limiting the speed of a vehicle running on a travel path, for example, Patent Literature 1 describes a travel control device including upper speed limit setting means for setting an upper speed limit in part of a section of a travel path, and instruction means for giving the vehicle travel conditions including the set upper speed limit associated with the part of the section as a travel instruction, where the vehicle runs the travel path in the part of the section at speeds that do not exceed the upper speed limit if the instruction means gives the travel instruction.

CITATION LIST

Patent Literature

Patent Literature 1: Unexamined Japanese Patent Application No. 2007-323675

SUMMARY

Technical Problem

A travel path provided at a mine is generally unpaved, and the road surface condition of the travel path (an uneven road surface condition or the moisture content of the road surface) changes with each passing hour due to the travel of vehicles and changes in the weather. Moreover, a huge mine may have a place having a clear sky and a place having rain, even at the same time or within a predetermined time period on the same mine property. In fine weather, a water truck including a tank where water is stored may water the road surface in order to prevent the occurrence of such reduced visibility that hinders the travel of the vehicle, the reduced visibility being caused by dust rising in the air from the dry road surface.

Patent Literature 1 describes that lateral accelerations are respectively associated with three preset weather conditions (fine weather, rain, and heavy rain), and then the weather condition is selected and accordingly the lateral acceleration is set (0065 in Patent Literature 1). However, Patent Literature 1 neither describes nor suggests how the weather condition, the amount of watering by a water truck, or the like is acquired and selected, and is susceptible to improvement in changing a speed limit in accordance with the road surface condition of a travel path at a mine, the road surface condition changing with each passing hour, and preventing the slip of a mining machine that runs on the travel path at the mine.

An object of the present invention is to prevent the slip of a mining machine that runs on a travel path at a mine and prevent the deterioration of the fuel consumption of the mining machine while suppressing the wear of tires.

Solution to Problem

According to the present invention, an operation control system for a mining machine comprising, based on travel path information including at least information on moisture content of a travel path on which a mining machine operating at a mine runs, and position information being information on a position of a travel path corresponding to the travel path information, generating speed limit information for changing a speed limit for the mining machine to run on the travel path corresponding to the travel path information.

In the present invention, it is preferable that a ranking of a condition of the travel path is set based on at least the travel path information and posture information as information on a posture of the mining machine, and the speed limit information is generated based on the set ranking.

In the present invention, it is preferable that the travel path information includes information on a precipitation amount of the mine or information on a watering amount on the travel path.

In the present invention, it is preferable that when speed limit information for reducing the speed limit is generated, speed limit information for returning the speed limit to the speed limit before reduction is generated based on elapsed time since water is stopped to be supplied to a travel path corresponding to the speed limit information for reducing the speed limit.

In the present invention, it is preferable that the speed limit information for returning the speed limit to the speed limit before reduction is generated further based on air temperature information including at least information on air temperature at the mine.

In the present invention, it is preferable that the operation control system for a mining machine comprises: a plurality of travel path information collection devices, placed in a plurality of places at the mine, which collect the travel path information; and a speed limit control device which generates the speed limit information.

In the present invention, it is preferable that the operation control system for a mining machine comprises: a vehicle-mounted wireless communication device, mounted on the mining machine, which performs communication; and a management-side wireless communication device, placed in a control facility at the mine, which communicates with the vehicle-mounted wireless communication device, wherein the speed limit control device is placed in the control facility at the mine, generates the speed limit information based on the travel path information and the position information acquired via the management-side wireless communication device, and transmits the generated speed limit information via the vehicle-mounted wireless communication device to a travel control device, mounted on the mining machine, which controls a travel speed of the mining machine.

In the present invention, it is preferable that the operation control system for a mining machine comprises a vehicle-mounted wireless communication device, mounted on the mining machine, which performs communication, wherein the speed limit control device is mounted on the mining machine, and acquires the travel path information and the position information via the vehicle-mounted wireless communication device.

In the present invention, it is preferable that the travel path information collection device includes a collection-side wireless communication device which performs communication, and the speed limit control device acquires the travel path information collected by the travel path information collection device via the collection-side wireless communication device and the management-side wireless communication device.

In the present invention, it is preferable that the travel path information collection device includes a collection-side wireless communication device which performs communication, and the speed limit control device acquires the travel path information collected by the travel path information collection device via the collection-side wireless communication device and the vehicle-mounted wireless communication device.

In the present invention, it is preferable that the mining machine is a driverless vehicle running based on previously acquired position information of a travel path, and the driverless vehicle includes a travel control device which controls a travel speed on the travel path corresponding to the position information, based on speed limit information corresponding to the position information.

According to the present invention, an operation control method for a mining machine comprises: acquiring travel path information including at least information on moisture content of a travel path on which a mining machine operating at a mine runs, and position information being information on a position of the travel path corresponding to the travel path information; and generating speed limit information for changing a speed limit for the mining machine to run on the travel path corresponding to the travel path information, based on the travel path information and the position information.

In the present invention, it is preferable that a ranking of a condition of the travel path is set based on at least the travel path information and posture information as information on a posture of the mining machine, and the speed limit information is generated based on the set ranking.

In the present invention, it is preferable that the travel path information includes information on a precipitation amount of the mine or information on a watering amount on the travel path.

In the present invention, it is preferable that when speed limit information for reducing the speed limit is generated, speed limit information for returning the speed limit to the speed limit before reduction is generated based on elapsed time since water is stopped to be supplied to a travel path corresponding to the speed limit information for reducing the speed limit.

In the present invention, it is preferable that the speed limit information for returning the speed limit to the speed limit before reduction is generated further based on air temperature information including at least information on air temperature at the mine.

The present invention can prevent the slip of a mining machine that runs on a travel path at a mine and prevent the deterioration of the fuel consumption of the mining machine while suppressing the wear of tires.

BRIEF DESCRIPTION OF DRAWINGS

FIG. 4 is a block diagram illustrating a vehicle control device, its peripheral devices, and the like.

DESCRIPTION OF EMBODIMENT

Hereinafter, a mode for carrying out the present invention (an embodiment) will be described in detail with reference to the drawings. The present invention is not to be limited by the contents described in the following embodiment.

Figure 1:
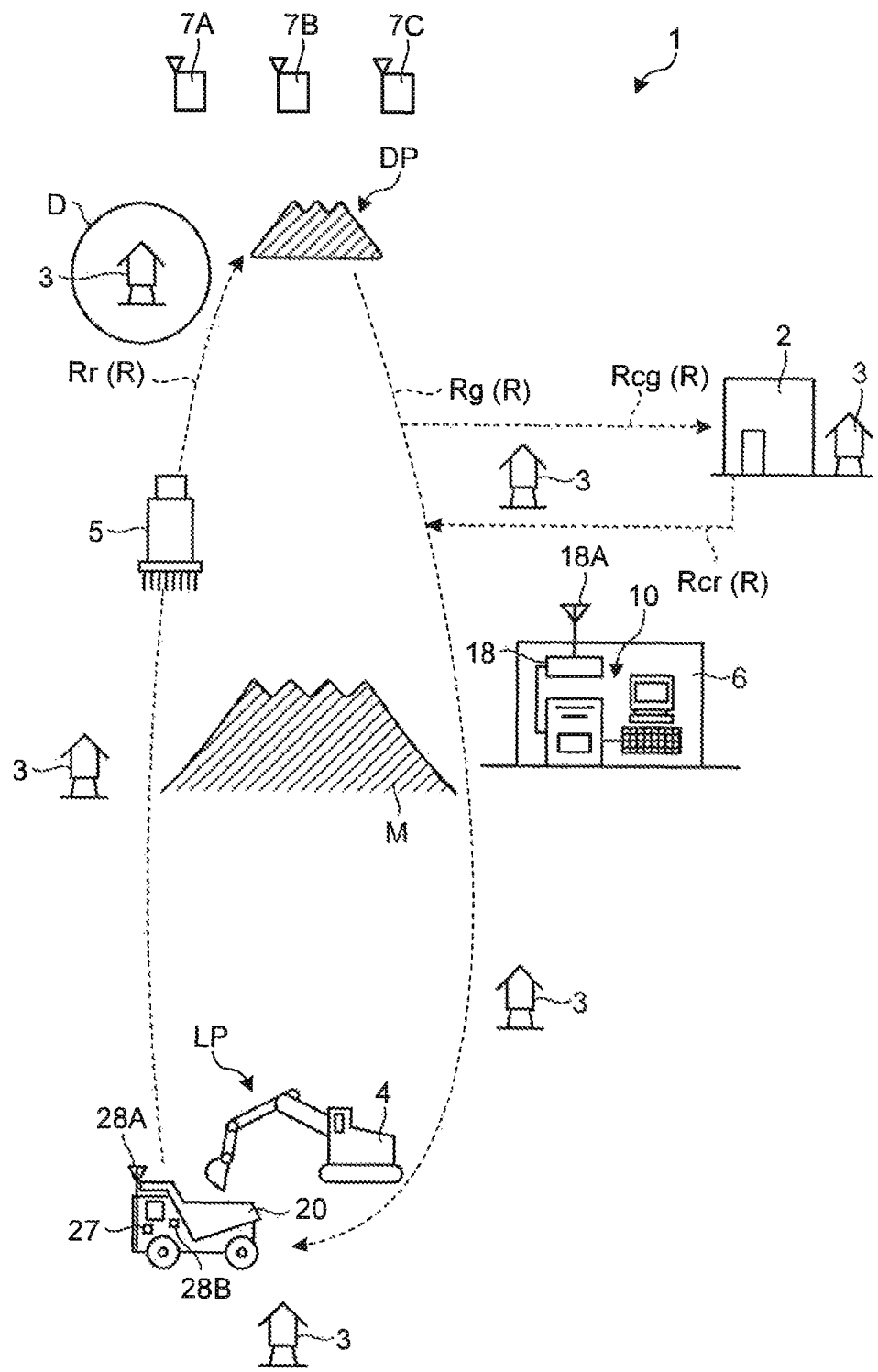
FIG. 1 is a diagram illustrating a site where an operation control system for a mining machine according to the embodiment is applied.

FIG. 1 is a diagram illustrating a site where an operation control system 1 for a mining machine according to the embodiment is applied. Based on travel path information including at least information on the moisture content in the road surface of a travel path on which a mining machine operating at a mine M runs, and position information indicating information on the position of the travel path corresponding to the travel path information, the operation control system 1 for a mining machine changes a speed limit for the mining machine to run on the travel path corresponding to the travel path information, in other words, the travel path corresponding to the position that has obtained the travel path information.

The mining machine is a generic name of machinery used for various operations at a mine. In the embodiment, a dump truck 20 that transports earth and sand, stones and rocks, or the like that are produced when quarrying or excavating crushed stone is taken as an example of a transport machine that is a kind of mining machine. However, as long as the mining machine has a self-propelled function, the mining machine is not limited to the dump truck 20. For example, the mining machine according to the embodiment may be a water truck including a tank where water is stored, a motor grader that grades a road surface, a wheel loader, or the like. Moreover, the dump truck 20 may be a rigid dump truck having an integrated vehicle body frame structure, which is steered by the front wheels, or an articulated dump truck having a structure where a vehicle body frame is divided into front and rear parts that are each independent, the articulated dump truck being capable of bending to the right and left.

At the mine, a load such as stones and rocks, earth and sand, or the like are loaded by an excavator 4 being a loading machine into a bed (a vessel 22) of the dump truck 20 in a place LP where a loading operation is performed (hereinafter, the load site). A wheel loader may be used as the loading machine. The dump truck 20 is then unloaded to deposit the loaded stones and rocks, earth and sand, or the like in a place DP where a load deposit operation is performed (hereinafter, the dump site). The dump truck 20 moves between the load site LP and the dump site DP, running on travel paths Rg and Rr. Moreover, the dump truck 20 passes a travel path Rcg to be refilled with fuel, moves to a gas station 2 away from its transport operation, goes back on a travel path Rcr after being refilled with fuel, and returns to the transport operation. The travel paths Rg and Rr or the travel paths Rcg and Rcr may be the same travel path, which may be a travel path that allows counterflow traffic for the dump trucks 20, or may be different travel paths as illustrated in FIG. 1.

If the road surfaces of the travel paths Rg and Rr, and the like become dry, dust rises in the air due to wind or the travel of the dump truck 20 and the like. Accordingly, a water truck 5 as a mining machine prevents the occurrence of dust by watering the travel paths Rg and Rr, and the like. Next, the outline of the operation control system 1 for a mining machine will be described. A description will be given below assuming that the dump truck 20 is a driverless vehicle that is controlled by the operation control system 1 for a mining machine over the magnitude of a travel speed, a route selection of a travel path R to run, and work (loading or depositing). Moreover, in the following, when there is no need to distinguish between the travel paths Rr, Rg, Rcg, Rcr, and the like, they are expressed as the travel path R.

<Outline of Operation Control System for Mining Machine>

In the operation control system for a mining machine (hereinafter referred to as the operation control system in some cases) 1, a mine management apparatus 10 as a speed limit control device executes an operation control method for a mining machine according to the embodiment (hereinafter referred to as the operation control method in some cases), and acquires, from a travel path information collection device on mine property, travel path information including at least information on the moisture content of the travel path R by wireless communication. The travel path information collection device is described in detail below. The mine management apparatus 10 then generates, based on the obtained travel path information and its corresponding position information, speed limit information used when changing a speed limit during the travel of the dump truck 20 as a mining machine on the travel path R in a place corresponding to the travel path information.

The mine management apparatus 10 is installed in a control facility 6 at the mine, and is used for production management, operations control, or the like at the mine. In the embodiment, the mine management apparatus 10 is used to realize the function of the speed limit control device. The operation control system 1 may include the speed limit control device separately from the mine management apparatus 10. In this manner, the method for realizing the speed limit control device is not limited in the embodiment. Moreover, the mine management apparatus 10 as the speed limit control device is installed in the control facility 6 at the mine in the embodiment and accordingly moving the mine management apparatus 10 is not taken into account. However, the speed limit control device may be mounted on, for example, the dump truck 20 or a passenger vehicle and move with the dump truck 20 or the passenger vehicle.

When the dump truck 20 runs on the travel path R, the mine management apparatus 10 gives the dump truck 20 an upper limit value of a speed limit during the travel of the dump truck 20 on the travel path R, in other words, a speed limit of each travel path R from the viewpoints of productivity at the mine, safety, and the suppression of the reduction of durability of the travel path R (excessive roughness of an uneven road surface). The dump truck 20 runs on the travel path R while performing control such that the actual travel speed does not exceed the speed limit given by the mine management apparatus 10. A specific content of control over travel speed is described below.

The speed limit information generated by the mine management apparatus 10 is information for changing the speed limit of the dump truck 20. The mine management apparatus 10 gives the dump truck 20 the speed limit information together with the position information of the travel path R on which the dump truck 20 runs (the geographical information of the travel path R), the position information (geographical information) of the load site LP and the dump site DP, information on the travel speed, and the like. The mine management apparatus 10 may give the dump truck 20 gradient information indicating the magnitude of the gradient of the travel path R. These pieces of information are referred to as the operation information in some cases. The mine management apparatus 10 is connected to a management-side wireless communication device 18 including a management-side antenna 18A to give the dump truck 20 the operation information of the dump truck 20. The mine management apparatus 10 transmits the speed limit information to the dump truck 20 via the management-side wireless communication device 18 and the management-side antenna 18A. If a plurality of the dump trucks 20 is operating at the mine M, the operation information including the speed limit information is transmitted to the plurality of the dump trucks 20.

The dump truck 20 can receive the operation information and transmit information on its own position (the self-position information of a mining machine) to the mine management apparatus 10. In other words, the dump truck 20 is for mutually communicating with the mine management apparatus 10. Hence, the dump truck 20 includes an antenna 28A together with a vehicle-mounted wireless communication device 27. In addition, the dump truck 20 can receive radio waves from GPS (Global Positioning System: global positioning system) satellites 7A, 7B, and 7C by a GPS antenna 28B, and determine the self-position. Information on the determined self-position is issued using the vehicle-mounted wireless communication device 27 and the antenna 28A, and transmitted to the mine management apparatus 10 via the management-side antenna 18A and the management-side wireless communication device 18. The dump truck 20 may measure its own position by not limited to the GPS satellite but another positioning satellite. In other words, the position may be determined by GNSS (global navigation satellite system: Global Navigation Satellite System). The dump truck 20 runs along the travel path R, comparing the determined self-position and the position information of the travel path R (the geographical information of the travel path R).

The operation control system 1 includes a weather-observing device 3 installed as the travel path information collection device on the mine property, more specifically, in the vicinity of the travel path R. The weather-observing device 3 collects the travel path information that is necessary when the mine management apparatus 10 generates speed limit information, and transmits the travel path information to the mine management apparatus 10.

The travel path information includes at least information on the moisture content of the road surface of the travel path R on which the dump truck 20 runs (hereinafter referred to as the travel path's moisture information in some cases). The moisture content of the road surface of the travel path R is, for example, moisture content per unit area of the travel path R, and serves as an index indicating the slipperiness of the travel path R during the travel of the dump truck 20. In other words, if the moisture content of the travel path R increases, the friction coefficient between the travel path R and the tire of the dump truck 20 decreases due to the effect of the moisture. As a consequence, the dump truck 20 that runs on such a travel path R is subject to slip (a skid) such as a sideslip during travel or a turn, or a wheelspin. Moreover, if such slip occurs, the wear of tires of the dump truck 20 advances, and the fuel for driving the engine is uselessly consumed. Moreover, if slip occurs, the road surface of the travel path R becomes rough to cause unevenness. The excessively uneven road surface becomes a cause of the occurrence of slip and a cause of the drop of a load during the travel of the dump truck 20.

The travel path R at the mine is generally unpaved. Accordingly, if the moisture content contained in the travel path R increases due to rainfall or the like, the travel path R tends to become muddy. As a consequence, it becomes easier to induce the slip of the dump truck 20. In this manner, at the mine, the moisture content of the road surface of the travel path R has a remarkable influence on slipperiness for the dump truck 20 running on the travel path R. Focusing on this point, the operation control system 1 and the operation control method according to the embodiment change a speed limit using the travel path's moisture information as an index indicating the slipperiness of the travel path R at the mine.

It is preferred that the travel path's moisture information include at least information on the moisture content (actual moisture content) contained in the travel path R. The information on the actual moisture content may be, for example, actual moisture content per unit area of the travel path R, the amount of rainfall or snowfall on the travel path R, or the amount of water used by the water truck 5 to water the travel path R. In the embodiment, it is relatively difficult to directly measure the actual moisture content of the travel path R. Therefore, the amount of rainfall or snowfall on the travel path R, or the amount of water used by the water truck 5 to water the travel path R is used. Consequently, it is possible to relatively easily obtain the actual moisture content and obtain the travel path's moisture information.

The travel path's moisture information may further include information on at least one of the air temperature and the humidity at the position of the travel path R, in addition to the information on the actual moisture content. Air temperature and humidity have an influence on the evaporation of the moisture of the travel path R. Therefore, at least one of them is added to the travel path's moisture information and accordingly it is possible to more appropriately evaluate the slipperiness of the travel path R.

For example, even if the actual moisture content is the same, the actual moisture content decreases in shorter time if the air temperature is high than if the air temperature is low. Hence, if the actual moisture content is the same, the higher the air temperature the more quickly the travel path R becomes dry to increase skid resistance. Moreover, even if the actual moisture content is the same, the actual moisture content decreases in shorter time if the humidity is low than if the humidity is high. Hence, if the actual moisture content is the same, the lower the moisture the more quickly the travel path R becomes dry to increase skid resistance. In this manner, it is possible to more appropriately evaluate the slipperiness of the travel path R and appropriately change a speed limit, by adding information on at least one of the air temperature and the humidity to the travel path's moisture information. It is considered that air temperature has a greater influence on the actual moisture content than humidity. Therefore, it is preferred that information on at least the air temperature out of the two be added to the travel path's moisture information.

The travel path's moisture information may further include information on the amount of solar radiation. Even if the air temperature is the same, the actual moisture content of the travel path R decreases more quickly and the road surface becomes dry if the sky is clear and there is a large amount of solar irradiation than if the sky is cloudy and there is a little amount of solar irradiation. Hence, the travel path's moisture information including information on the amount of solar radiation is used to enable more appropriate evaluation of the slipperiness of the travel path R and more appropriate change of the speed limit. The amount of solar radiation may be measured directly or estimated indirectly from the weather. If the amount of solar radiation is estimated, further consideration may be given to a time period when the sun is in the sky and the altitude of the sun that changes depending on the season in addition to the weather such as fine weather or cloudy weather. Consequently, the accuracy of the estimation of the amount of solar radiation can be improved and accordingly the influence of the actual moisture content can be estimated more correctly. As a consequence, it is possible to more appropriately evaluate the slipperiness of the travel path R and appropriately change the speed limit.

The weather-observing device 3 includes various measuring devices for detecting the travel path's moisture information and information on the air temperature, humidity, and weather. Such measuring devices include, for example, a rain gauge, a thermometer, and a hygrometer. Such weather-observing devices 3 are installed in a plurality of places on the mine property. It is desirable that the installation place of the weather-observing device 3 be determined while associated with at least one of the design content of the travel path R at the mine (the characteristic of the travel path R such as a straight line, a curve, an upgrade, or a downgrade), and the terrain of the mine (the height of a place where there is the travel path R and a place susceptible to shade). In other words, the weather-observing device 3 is installed in a place where the moisture content (actual moisture content) of the travel path R is likely to change. Accordingly, the speed limit can be changed accurately.

When the mine management apparatus 10 generates the speed limit information, the above-mentioned travel path information and also position information being information on the position of the travel path R, the position information corresponding to the travel path information, are required. The position information includes at least information on a position where the weather-observing device 3 is installed. The position information includes at least the latitude and longitude of the place where the weather-observing device 3 is installed, and may further include altitude. The mine management apparatus 10 can use, as the position information, a position determined by the weather-observing device 3 itself using, for example, radio waves from the GPS satellites 7A, 7B, and 7C. Moreover, it may be configured such that the position information of the place where the weather-observing device 3 is installed is measured in advance, and the weather-observing device 3 is associated with identification information to store the information in a storage device 13 included in the mine management apparatus 10. According to the method where the weather-observing device 3 itself determines its own position, there is the advantage to save trouble and time to measure the position of the weather-observing device 3 and store the position in the mine management apparatus 10. Moreover, the travel path R is newly installed or changed at the mine according to the progress of quarrying or the like. In step with this, the weather-observing device 3 needs to be relocated. However, also in this case, according to the method where the weather-observing device 3 itself determines its own position, there is the advantage to save trouble and time to measure the position of the weather-observing device 3 and store the position in the mine management apparatus 10. The method where the position information of a place where the weather-observing device 3 is installed is measured in advance has the advantage that there is no need to mount, on the weather-observing device 3, a device for measuring position information.

As described above, it is preferred that the weather-observing device 3 be placed in the vicinity of the travel path R to collect the travel path information that is necessary to generate speed limit information. The weather-observing devices 3 are installed in the plurality of places at the mine. In other words, the operation control system 1 includes a plurality of the weather-observing devices 3. The higher the number of places to install the weather-observing device 3, the mine management apparatus 10 can acquire the travel path information from more places. Accordingly, the speed limit information can be generated more appropriately. Next, the mine management apparatus 10 as the speed limit control device will be described in more detail.

<Speed Limit Control Device>

Figure 2:
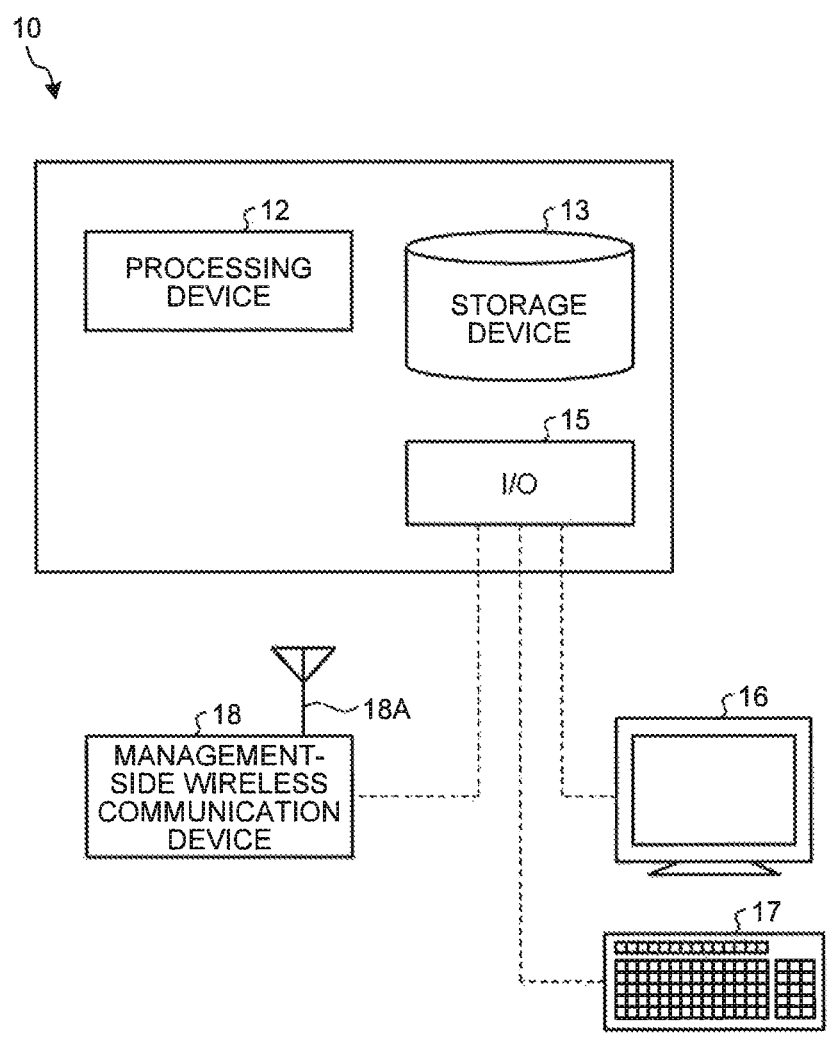
FIG. 2 is a block diagram illustrating the configuration of a mine management apparatus included in the operation control system according to the embodiment.

FIG. 2 is a block diagram illustrating the configuration of the mine management apparatus 10 included in the operation control system 1 according to the embodiment. The mine management apparatus 10 as the speed limit control device includes a processing device 12, the storage device 13, and an input/output unit (I/O) 15. The input/output unit 15 of the mine management apparatus 10 is connected to a display device 16, an input device 17, and the management-side wireless communication device 18. The mine management apparatus 10 is, for example, a computer. The processing device 12 is, for example, a CPU (Central Processing Unit). The storage device 13 is, for example, a RAM (Random Access Memory), a ROM (Read Only Memory), a flash memory, or a hard disk drive, or a combination thereof. The storage device 13 may be a server. The input/output unit 15 is used for the input/output (interface) of information into/from the processing device 12, the display device 16 connected to the outside of the processing device 12, the input device 17, and the management-side wireless communication device 18.

The processing device 12 executes the operation control method according to the embodiment. In other words, the processing device 12 generates speed limit information based on the above-described travel path information and position information. In this case, the processing device 12 reads, from the storage device 13, a computer program that realizes the operation control method according to the embodiment and executes the computer program. The storage device 13 stores things such as the computer program that realizes the operation control method according to the embodiment, and a database including information (the speed limit information corresponding to each travel path R, which has been set in the past, and the like) necessary for the computer program that realizes the operation control method according to the embodiment.

The display device 16 is, for example, a liquid crystal display, and displays, for example, the travel path information of the travel path R. The input device 17 is, for example, a keyboard, a touch panel, or a mouse, and inputs information necessary for the operation control method according to the embodiment. The management-side wireless communication device 18 includes the management-side antenna 18A and mutually executes wireless communication with the vehicle-mounted wireless communication device 27 of the dump truck 20. An established communication infrastructure capable of data communication only within the mine property (for example, pursuant to a wireless LAN standard), or wireless communication pursuant to a standard for satellite wave communication or ground wave communication, or the like can be applied as a wireless communication mode. Considering the establishment situation of the communication infrastructure at a site at the mine, communication cost, and the like, the wireless communication mode is appropriately selected and used. Next, the dump truck 20 will be described in more detail.

<Dump Truck>

Figure 3:
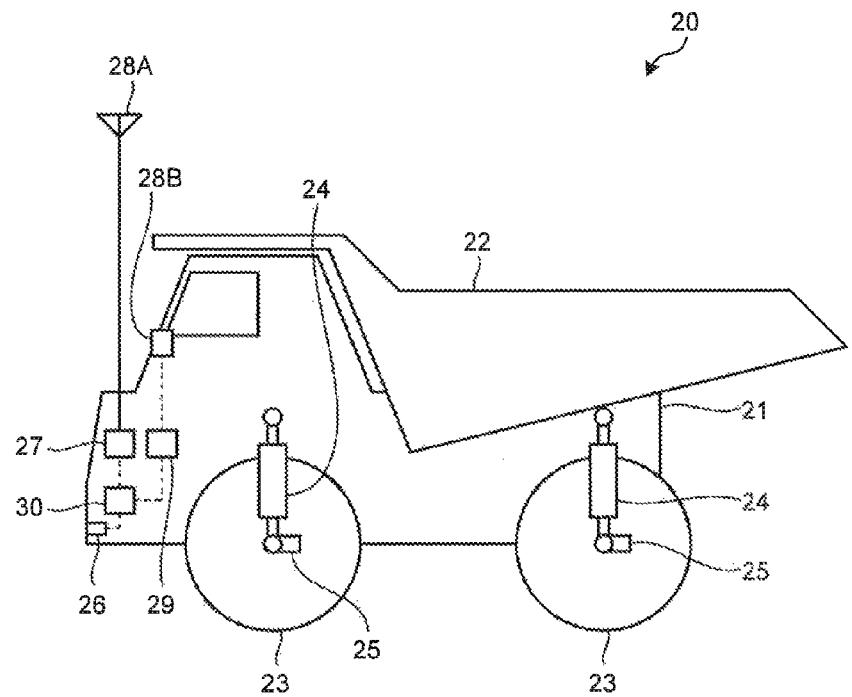
FIG. 3 is a diagram illustrating the configuration of a dump truck.

FIG. 3 is a diagram illustrating the configuration of the dump truck 20. The dump truck 20 runs with a load thereon, and deposits the load in a desired place. the dump truck 20 includes a vehicle body 21, the vessel 22, wheels 23, suspension cylinders 24, rotary sensors 25, a front information detection sensor 26, the vehicle-mounted wireless communication device 27 connected to the antenna 28A, a vehicle-mounted position information detection device (GPS receiver in the embodiment) 29 to which the GPS antenna 28B is connected, and a vehicle control device 30 functioning as a travel control device. The dump truck 20 includes various mechanisms and functions, which are included in a common transport vehicle, other than the above configurations. In the embodiment, a description is given taking, as an example, the rigid dump truck 20 that steers the front wheels (the wheels 23). The dump truck 20 may be an articulated truck made by dividing its vehicle body frame into front and rear parts and coupling them with a free joint.

The dump truck 20 drives a motor 33B by electric power generated by causing an internal combustion engine 33A such as a diesel engine to drive a generator, and drives the wheels 23. In this manner, the dump truck 20 is what is called an electric drive. However, the drive method of the dump truck 20 is not limited to the electric drive. For example, the dump truck 20 may be the mechanical drive dump truck 20 including a configuration where power generated by the internal combustion engine 33A is transmitted to the wheels (tires) 23 via an unillustrated transmission. In this case, the amount of fuel supplied from a fuel injection device to the internal combustion engine 33A is adjusted at the instruction of the vehicle control device 30 and the output of the internal combustion engine 33A is adjusted.

The vessel 22 functions as a bed where a load is loaded, and is placed on top of the vehicle body 21. Quarried crushed stone, rocks or earth, or the like is loaded as a load by a loading machine such as the excavator 4 into the vessel 22. Moreover, an unillustrated hydraulic cylinder (hoist cylinder) is connected to the vessel 22. The deposit operation can be performed by extending the hoist cylinder at the instruction of the vehicle control device 30 and lifting the vessel 22. The wheel 23 includes a tire and a wheel, and is attached to the vehicle body 21. Power from the motor mounted on the vehicle body 21 is transmitted to rotate and drive the wheels 23. Moreover, the front wheels of the wheels 23 can be steered in the right and left directions by an unillustrated hydraulic cylinder (steering cylinder). The dump truck 20 can turn and run by causing the steering cylinder to perform extension and contraction operations at the instructions of the vehicle control device 30 and causing the wheels 23 to operate toward the right and left. The suspension cylinder 24 is placed between the wheel 23 and the vehicle body 21. Load in accordance with the weight of the vehicle body 21, the vessel 22, and a load when loaded works on the wheels 23 via the suspension cylinders 24. A hydraulic fluid is sealed inside the suspension cylinder 24. The suspension cylinder performs extension and contraction operations in accordance with the weight of a load.

The rotary sensor 25 detects the rotational speed of the wheel 23 to measure the travel speed of the dump truck 20. The GPS antenna 28B receives radio waves output from the plurality of GPS satellites 7A, 7B, and 7C (see FIG. 1) constituting GPS (Global Positioning System). The GPS antenna 28B outputs the received radio waves to the vehicle-mounted position information detection device 29. The vehicle-mounted position information detection device 29 converts the radio wave received by the GPS antenna 28B into an electrical signal and calculates (determines) its own position information, in other words, the position information of the dump truck 20 (hereinafter, the self-position information). The travel speed of the dump truck 20 can also be obtained based on the self-position information determined by the vehicle-mounted position information detection device 29. The vehicle-mounted wireless communication device 27 mutually performs wireless communication with the management-side antenna 18A illustrated in FIG. 1 via the antenna 28A. The vehicle-mounted wireless communication device 27 is connected to the vehicle control device 30. Furthermore, the vehicle-mounted position information detection device 29 is connected to the vehicle control device 30. With such a configuration, the vehicle control device 30 can transmit and receive various pieces of information including the self-position information of the dump truck 20 and the operation information via the antenna 28A. Next, the vehicle control device 30 will be described.

<Vehicle Control Device>

Figure 4:
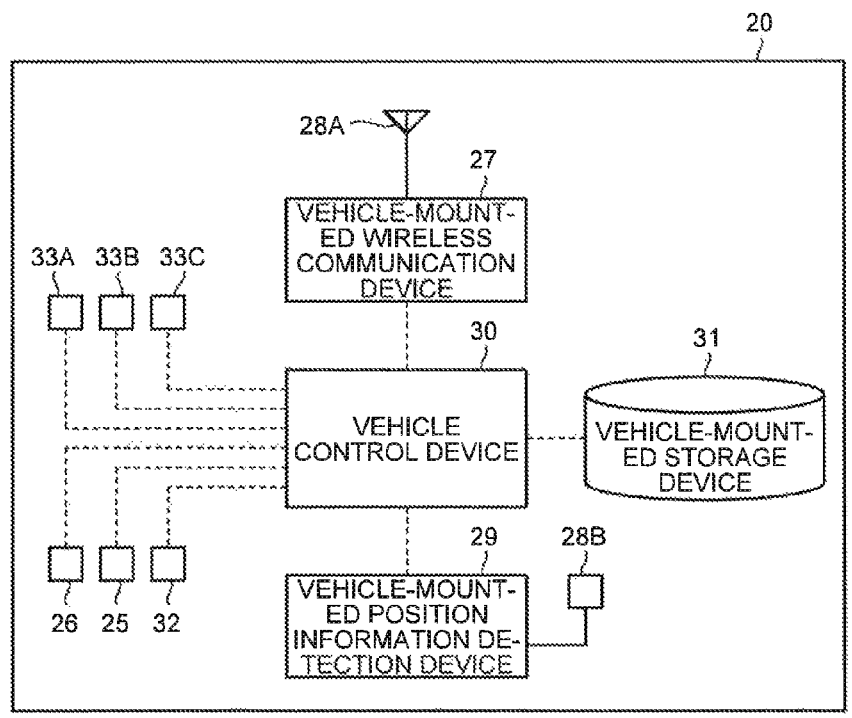

FIG. 4 is a block diagram illustrating the vehicle control device 30, its peripheral devices, and the like. The vehicle control device 30 included in the dump truck 20 is connected to a vehicle-mounted storage device 31, the vehicle-mounted wireless communication device 27, and the vehicle-mounted position information detection device 29. The vehicle control device 30 is connected to the rotary sensor 25, the front information detection sensor 26, and a turning angle sensor 32 as detection devices that detect a state of the dump truck 20 itself and the ambient environment. For example, a computer (information processing device) that is a combination of a CPU (Central Processing Unit) and a memory is used as the vehicle control device 30.

The front information detection sensor 26 detects an object existing ahead of the dump truck 20 with respect to the travel direction (for example, the dump truck 20 or another mining machine that runs ahead, or an obstacle such as a rockfall existing on the travel path R). For example, a sensor using a millimeter wave radar or a laser rangefinder is used as, for example, the front information detection sensor 26. Information detected by the front information detection sensor 26 is used for automatic driving of the driverless dump truck 20. In other words, when the front information detection sensor 26 detects the existence of an obstacle ahead of the dump truck 20, the dump truck 20 is reduced in speed or stopped by transmitting obstacle detection information to the vehicle control device 30 and causing the vehicle control device 30 to give the fuel injection device an instruction to reduce engine output or to give a braking instruction to a brake provided to the wheel 23. For example, a yaw sensor is used for the turning angle sensor 32, and the turning angle sensor 32 detects the turning angle during the turn of the dump truck 20.

For example, the vehicle control device 30 controls the output of the internal combustion engine 33A mounted on the dump truck 20, the output of the motor 33B, and the operation of a hydraulic control device 32C. In this manner, the vehicle control device 30 executes each control operation and accordingly the dump truck 20 consecutively controls the acceleration and deceleration of the travel speed on the travel path R, the steering direction of the wheels 23, and the like based on the operation information transmitted from the mine management apparatus 10 illustrated in FIGS. 1 and 2. Furthermore, the extension and contraction of the unillustrated hydraulic cylinder for lifting up and down the vessel 22 at the load site LP and the dump site DP are controlled. In other words, the dump truck 20 compares the geographical information of the travel path R included in the operation information with the self-position information while successively calculating (determining) its own position by the vehicle-mounted position information detection device 29 and accordingly can run at a travel speed (speed limit) set for each travel path R so as not to deviate from the travel path R and further can stop at the load site LP and the dump site DP and perform predetermined loading and deposit operations. At this point in time, the vehicle control device 30 controls the travel speed of the dump truck 20 based on the speed limit information included in the operation information transmitted from the mine management apparatus 10 so as not to exceed the speed limit of the travel path R. Moreover, the vehicle control device 30 controls the travel speed of the dump truck 20 or the steering direction of the wheels 23 based on obstacle information detected by the front information detection sensor 26, and controls the posture of the dump truck 20 based on the information detected by the turning angle sensor 32.

The vehicle-mounted storage device 31 is, for example, a RAM (Random Access Memory), a ROM (Read Only Memory), a flash memory, or a hard disk drive, or their combination. The vehicle-mounted storage device 31 stores a computer program where instructions used for the control of the dump truck 20 are described and data used for the control of the dump truck 20. Moreover, the vehicle-mounted storage device 31 stores the operation information, the travel path information, or the speed limit information that is received from the mine management apparatus 10 via the vehicle-mounted wireless communication device 27. If the speed limit control device generates speed limit information based on travel path information, the vehicle-mounted storage device 31 does not always need to store the travel path information. The vehicle control device 30 reads and executes the computer program stored in the vehicle-mounted storage device 31 and reads and uses various pieces of information and data that are stored in the vehicle-mounted storage device 31 if needed and accordingly controls the travel operation and turning operation of the dump truck 20 or the vertical movement of the vessel 22.

In the embodiment, if the speed limit control device is mounted on the dump truck 20, the vehicle control device 30 realizes the function of the speed limit control device. In this case, the vehicle control device 30 executes the operation control method according to the embodiment. In this case, the vehicle control device 30 acquires travel path information and position information via the antenna 28A and the vehicle-mounted wireless communication device 27. The vehicle control device 30 then generates speed limit information based on the acquired travel path information and position information, and controls the travel speed of the dump truck 20 based on the speed limit information so as not to exceed the speed limit of the travel path R.

If the speed limit control device is not included in the mine management apparatus 10, but is mounted on the dump truck 20, the vehicle control device 30 may acquire travel path information and position information directly from the weather-observing device 3, or may acquire travel path information and its corresponding position information via the mine management apparatus 10 illustrated in FIGS. 1 and 2. Moreover, for example, after an identifier indicating each weather-observing device 3 is associated with position information, the identifier and the position information are stored in advance in the vehicle-mounted storage device 31. The vehicle control device 30 may acquire a plurality of pieces of travel path information together with identifiers, read position information corresponding to the acquired identifiers from the vehicle-mounted storage device 31, and accordingly extract travel path information necessary to generate speed limit information, and position information corresponding to the travel path information. Next, the weather-observing device 3 will be described.

<Weather-Observing Device>

Figure 5:
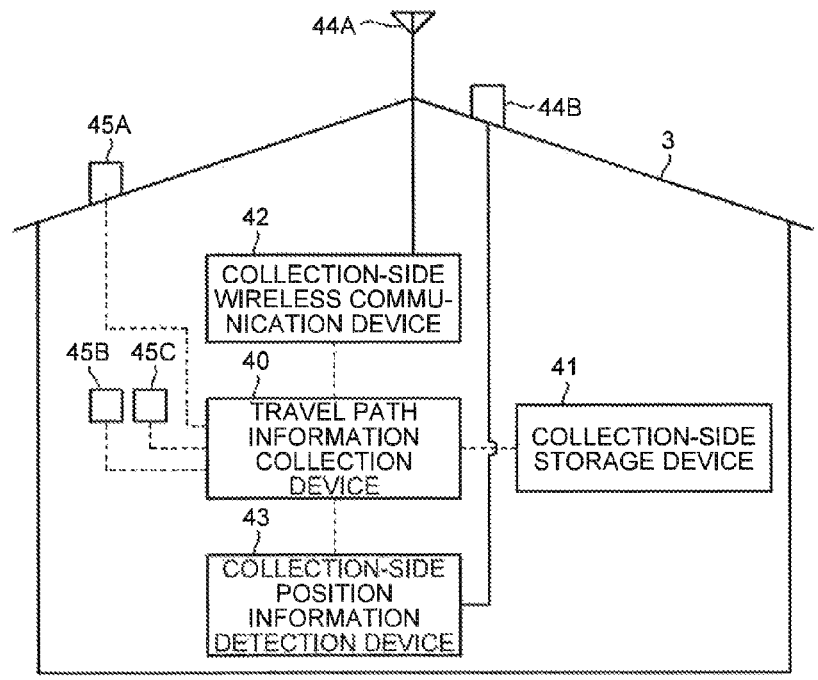
FIG. 5 is a functional block diagram of a weather-observing device.

FIG. 5 is a block diagram illustrating the configuration of the weather-observing device 3. The weather-observing device 3 includes a travel path information collection device 40, a collection-side storage device 41, a collection-side wireless communication device 42, and a collection-side position information detection device 43. The travel path information collection device 40 is, for example, an information processing device, and includes a CPU and the like. The collection-side storage device 41 is, for example, a RAM, a ROM, a flash memory, or a hard disk drive, or their combination, and is a storage device that stores various pieces of information and data.

The collection-side wireless communication device 42 is connected to a collection-side antenna 44A. The collection-side wireless communication device 42 mutually performs wireless communication with the management-side antenna 18A illustrated in FIG. 1 via the collection-side antenna 44A. On the other hand, if the speed limit control device is mounted on the dump truck 20, the collection-side wireless communication device 42 mutually performs wireless communication with the antenna 28A illustrated in FIG. 4 via the collection-side antenna 44A. The collection-side position information detection device 43 is connected to a collection-side GPS antenna 44B. The collection-side position information detection device 43 converts a radio wave received by the collection-side GPS antenna 44B into an electrical signal, and calculates (determines) its own position information, in other words, the position information of the weather-observing device 3.

The travel path information collection device 40 collects travel path information and generates travel path information for transmission from the weather-observing device 3 to the outside. A group of various sensors for collecting travel path information is connected to the travel path information collection device 40. The group of various sensors for collecting travel path information includes, for example, a precipitation amount detection sensor 45A, a thermometer 45B, and a hygrometer 45C, which are connected to the travel path information collection device 40. The precipitation amount detection sensor 45A can be realized by, for example, various rain gauges, quantitatively measures the amount of rainfall per predetermined time, and transmits numerical data indicating the amount of rainfall to the travel path information collection device 40. Moreover, in an area where snowfall is expected at a mine, it is configured to provide a snow gauge as the precipitation amount detection sensor 45A, and transmit numerical data indicating the amount of snowfall to the travel path information collection device 40. Naturally, it is preferred at a mine in an area having both rainfall and snowfall to provide both a rain gauge and a snow gauge as the precipitation amount detection sensor 45A. Moreover, the precipitation amount detection sensor 45A may include a rain sensor or a snow sensor that detects rain or snow. It may be configured such that the activation of the device such as the rain gauge, the snow gauge, or the travel path information collection device 40 is triggered by the detection of rainfall or snowfall by the rain sensor or snow sensor. The device then starts measuring the amount of rainfall or snowfall. Moreover, such a rain sensor or snow sensor can detect the presence or absence of rainfall or snowfall, and detect whether or not rainfall or snowfall is continuing. However, if the weather-observing device 3 does not include such a rain sensor or snow sensor but includes only a rain gauge or snow gauge, it is configured such that the snow gauge or rain gauge detects an increase in the amount of rainfall or snowfall per unit time. Accordingly, it is possible to detect whether or not rainfall or snowfall is continuing. The group of various sensors for collecting travel path information is not limited to them. An appropriate sensor is used in accordance with the kind of travel path information collected by the travel path information collection device 40, whenever appropriate.

The travel path information collection device 40 transmits travel path information generated by being collected from the precipitation amount detection sensor 45A, the thermometer 45B, and the like to the management-side antenna 18A illustrated in FIGS. 1 and 2 via the collection-side wireless communication device 42 and the collection-side antenna 44A. The mine management apparatus 10 as the speed limit control device receives the travel path information via the management-side wireless communication device 18. Consequently, the mine management apparatus 10 can acquire the travel path information from the travel path information collection device 40 included in the weather-observing device 3.

Moreover, the travel path information collection device 40 transmits position information calculated (determined) by the collection-side position information detection device 43, the position information indicating the current position of the weather-observing device 3 (hereinafter, the position information of the weather-observing device 3), to the management-side antenna 18A illustrated in FIGS. 1 and 2 via the collection-side wireless communication device 42 and the collection-side antenna 44A. The mine management apparatus 10 as the speed limit control device receives the position information of the weather-observing device 3 via the management-side wireless communication device 18. Consequently, the mine management apparatus 10 can acquire the position information of the weather-observing device 3 from the travel path information collection device 40 of the weather-observing device 3. Since the place where the weather-observing device 3 is installed is known in advance, position information on the installation place may be measured and obtained in advance, and stored in the storage device 13 of the mine management apparatus 10 illustrated in FIG. 2. In this case, the weather-observing device 3 does not need to include the collection-side position information detection device 43 and the collection-side GPS antenna 44B. Accordingly, the number of components of the weather-observing device 3 can be reduced. Therefore, installation cost and operation cost can be reduced.

If the speed limit control device is not included in the mine management apparatus 10 but is mounted on the dump truck 20, the travel path information collection device 40 uses the collection-side wireless communication device 42 and the collection-side antenna 44A to transmit travel path information to the outside. The dump truck 20 receives the travel path information via the antenna 28A and the vehicle-mounted wireless communication device 27, which are illustrated in FIG. 4, and transmits the travel path information to the vehicle control device 30 as the speed limit control device. In this case, as described above, the dump truck 20 may acquire travel path information via the mine management apparatus 10 or acquire travel path information directly from the weather-observing device 3. Consequently, the vehicle control device 30 of the dump truck 20 can acquire the travel path information from the travel path information collection device 40 included in the weather-observing device 3.

Moreover, if the speed limit control device is mounted on the dump truck 20, the travel path information collection device 40 transmits position information calculated (determined) by the collection-side position information detection device 43 to the antenna 28A and the vehicle-mounted wireless communication device 27, which are illustrated in FIG. 4, via the collection-side wireless communication device 42 and the collection-side antenna 44A. The vehicle control device 30 receives the position information of the weather-observing device 3. Consequently, the vehicle control device 30 of the dump truck 20 can acquire the position information of the weather-observing device 3 from the travel path information collection device 40 of the weather-observing device 3.

If the speed limit control device is mounted on the dump truck 20, as described above, the position information of the weather-observing device 3 may be associated with an identifier indicating the weather-observing device 3 and stored in the vehicle-mounted storage device 31 illustrated in FIG. 4, and the vehicle control device 30 may generate speed limit information using the position information of the weather-observing device 3 stored in the vehicle-mounted storage device 31. Consequently, the weather-observing device 3 does not need to include the collection-side position information detection device 43 and the collection-side GPS antenna 44B. Accordingly, the number of components of the weather-observing device 3 can be reduced. Therefore, installation cost and operation cost can be reduced. Next, the water truck 5 as a mining machine will be described.

<Water Truck>

Figure 6:
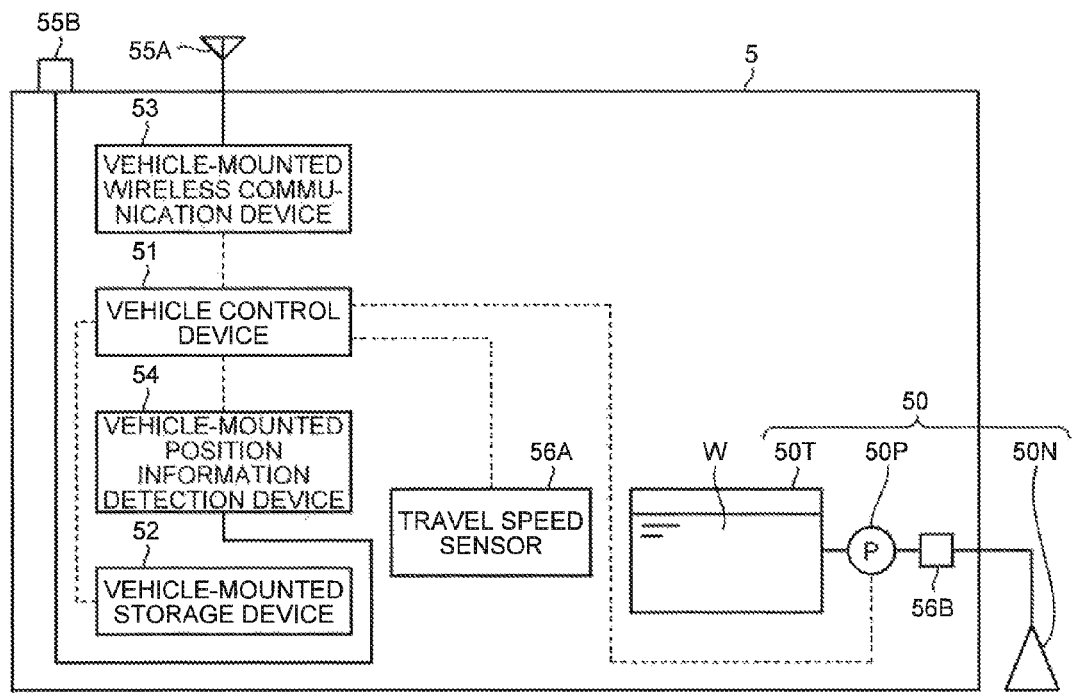
FIG. 6 is a block diagram illustrating the configuration of a water truck.

FIG. 6 is a block diagram illustrating the configuration of the water truck 5. The water truck 5 is a mining machine that waters the travel path R at the mine while running at the instruction of the mine management apparatus 10 illustrated in FIGS. 1 and 2. There is a controller who monitors or controls the road surface condition of the travel path R on the mine property in the control facility 6, and the controller issues an instruction to water or stop watering to an operator who drives and operates the water truck 5 in accordance with the controller's judgment. The water truck 5 includes a watering apparatus 50 having a water tank 50T where water W is stored, a pump 50P, and a watering nozzle 50N. Moreover, the water truck 5 includes a vehicle control device 51 functioning as the travel control device, a vehicle-mounted storage device 52, a vehicle-mounted wireless communication device 53, and a vehicle-mounted position information detection device 54. The vehicle control device 51 is connected to a travel speed sensor 56A that detects the travel speed of the water truck 5, and a flow sensor 56B that detects the flow rate of the water W discharged by the pump 50P to the watering nozzle 50N (the amount of water discharged per unit time by the pump 50P, and hereinafter referred to as the watering flow rate in some cases).

The vehicle control device 51 is, for example, a computer (information processing device) that is a combination of a CPU and a memory. The vehicle-mounted storage device 52 is, for example, a RAM, a ROM, a flash memory, or a hard disk drive, or their combination, and is a storage device that stores various pieces of information and data. The vehicle control device 51 controls, for example, the watering operation of the water truck 5. The vehicle-mounted storage device 52 stores a computer program where instructions necessary to control the water truck 5 are described, data used for the control of the water truck 5, and the like. The vehicle control device 51 reads and executes the computer program stored in the vehicle-mounted storage device 52 and reads and uses the data stored in the vehicle-mounted storage device 52 if needed and accordingly controls the operation of the water truck 5.

The water truck 5 can receive radio waves from the GPS (Global Positioning System: global positioning system) satellites 7A, 7B, and 7C by a GPS antenna 55B, and determine the self-position. The GPS antenna 55B outputs the received radio wave to the vehicle-mounted position information detection device 54. The vehicle-mounted position information detection device 54 converts the radio wave received by the GPS antenna 55B into an electrical signal and calculates (determines) its own position information, in other words, the position information of the water truck 5 (hereinafter, the self-position information). The vehicle-mounted wireless communication device 53 mutually performs wireless communication with the management-side antenna 18A illustrated in FIG. 1 via an antenna 55A. An established communication infrastructure capable of data communication only within the mine property (for example, pursuant to a wireless LAN standard), wireless communication pursuant to a standard for satellite wave communication or ground wave communication, or the like can be applied as a wireless communication mode. Considering the establishment situation of the communication infrastructure at a site at the mine, and communication cost, the wireless communication mode is appropriately selected and used.

In the embodiment, the vehicle control device 51 can compute and obtain a watering amount using, as travel path information, information on the amount of the water W used by the water truck 5 to water the travel path R (the watering amount). Since the watering flow rate can be measured by the flow sensor 56B provided to the water truck 5, the watering flow rate by the pump 50P is multiplied by watering time and accordingly the watering amount can be obtained. Moreover, the watering flow rate by the pump 50P is divided by a travel speed detected by the travel speed sensor 56A of the water truck and accordingly the watering amount per unit length for the travel path R can be obtained. If the width of the travel path R is constant, the watering flow rate by the pump 50P is divided by the travel speed of the water truck and the width of the travel path. Accordingly, the watering amount per unit area for the travel path R can be obtained. In this case, data on the width of the travel path R related to a position to be watered may be stored in advance in the vehicle-mounted storage device 52. Moreover, data on the widths of the travel paths R, the data being associated with data indicating their positions on the mine property, may be received from the mine management apparatus 10 via the vehicle-mounted wireless communication device 53 and the antenna 55A. The position of the water truck 5 itself detected by the vehicle-mounted position information detection device 54 is compared to the positions associated with the data on the widths of the travel paths R. Accordingly, data on the width of the travel path R may be selected to obtain the watering amount.

The vehicle control device 51 transmits information on the watering amount as the travel path information to the management-side antenna 18A and the management-side wireless communication device 18, which are illustrated in FIGS. 1 and 2, via the vehicle-mounted wireless communication device 53 and the antenna 55A. The mine management apparatus 10 receives the travel path information. Moreover, the vehicle control device 51 transmits the self-position information of the water truck 5 determined by the vehicle-mounted position information detection device 54 using the GPS antenna 55B to the mine management apparatus 10 via the vehicle-mounted wireless communication device 53 and the antenna 55A. In this manner, the mine management apparatus 10 acquires the travel path information and the self-position information of the water truck 5 from the water truck 5. Next, the operation control method according to the embodiment will be described.

<Operation Control Method>

Figure 7:
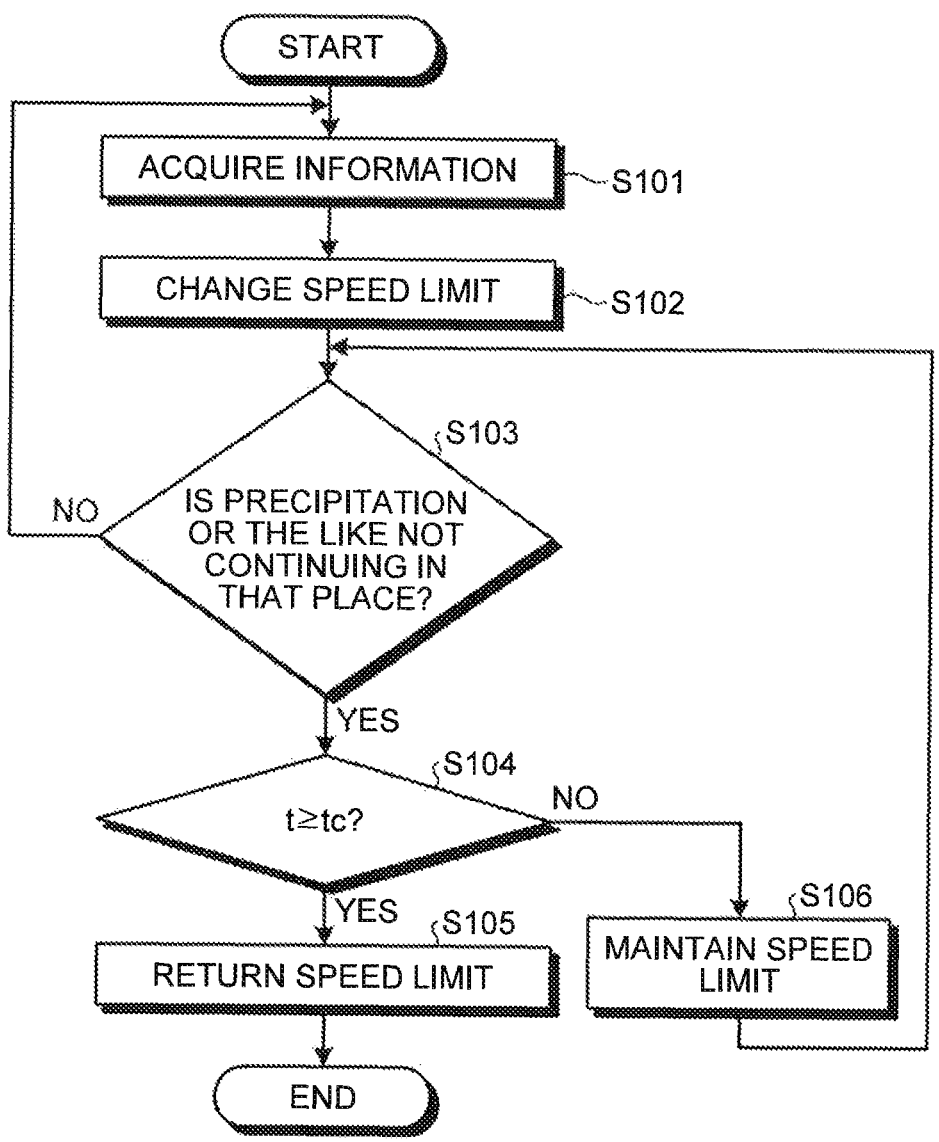
FIG. 7 is a flowchart illustrating an example of an operation control method according to the embodiment.
Figure 8:
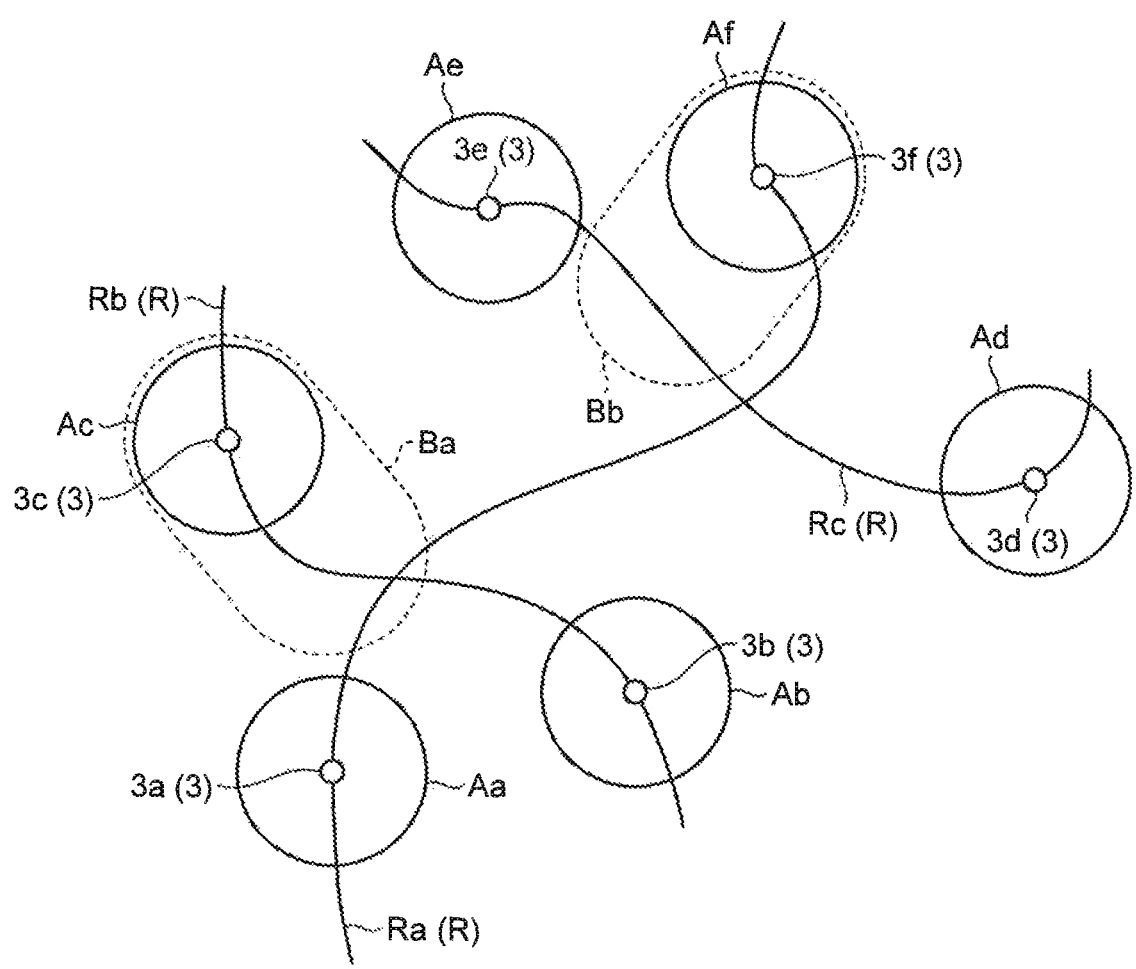
FIG. 8 is an explanatory view of an example of the operation control method according to the embodiment.

FIG. 7 is a flowchart illustrating an example of the operation control method according to the embodiment. FIG. 8 is an explanatory view of an example of the operation control method according to the embodiment. Upon the execution of the operation control method according to the embodiment, in step S101, the mine management apparatus 10 as the speed limit control device, more specifically, the processing device 12 (see FIG. 2) acquires travel path information and its corresponding position information from the weather-observing device 3 installed at the mine. As described above, if position information is stored in advance in the storage device 13 of the mine management apparatus 10, the processing device 12 acquires position information corresponding to the travel path information from the storage device 13 (an information acquisition step).

For example, if weather-observing devices 3a, 3b, 3c, 3d, 3e, and 3f are installed in the vicinities of travel paths Ra, Rb, and Rc constructed on the mine property as illustrated in FIG. 8, the mine management apparatus 10 acquires travel path information collected respectively by the weather-observing devices 3a, 3b, 3c, 3d, 3e, and 3f together with position information (the position information of the weather-observing devices 3a, 3b, 3c, 3d, 3e, and 3f), respectively from the weather-observing devices 3a, 3b, 3c, 3d, 3e, and 3f. The processing device 12 then associates the plurality of pieces of travel path information acquired by the mine management apparatus 10 respectively with the position information of the weather-observing devices 3a, 3b, 3c, 3d, 3e, and 3f, and stores them in the storage device 13. In the following, when there is no need to distinguish between the travel paths Ra, Rb, and Rc, they are referred to as the travel path R as appropriate. Moreover, if there is no need to distinguish between the weather-observing devices 3a, 3b, 3c, 3d, 3e, and 3f, they are referred to as the weather-observing device 3 as appropriate.

Next, in step S102, the mine management apparatus 10 generates speed limit information based on the travel path information acquired from the weather-observing devices 3a, 3b, 3c, 3d, 3e, and 3f (in this example, including data indicating precipitation amounts in areas Aa, Ab, Ac, Ad, Ae, and Af) and the position information corresponding respectively to the weather-observing devices 3 (a speed limit information generation step). In this example, assume that the road surface of the travel path R in a certain place actually is slippery due to precipitation (at least one of rainfall and snowfall). Hence, the speed limit information generated by the mine management apparatus 10 includes, for example, information to change the speed limit to a speed limit lower than a speed limit based on a design value for the travel path R at the mine. The speed limit based on the design value for the travel path R at the mine is a speed limit of the travel path R set in a state of no precipitation based on, for example, the radius of curvature, a gradient, and an average friction coefficient of the travel path R. Moreover, the speed limit is also a speed limit at which the dump truck 20 can run on the travel path R safely and excellently in production efficiency in the state of no precipitation. The speed limit information used to change the speed limit when there is precipitation is not limited to speed limit information with reference to the speed limit based on the design value for the travel path R at the mine. For example, the speed limit information may include information to change the speed limit to a lower speed limit with reference to a speed limit immediately before generating the speed limit information, in other words, a speed limit immediately before changing the speed limit. In the embodiment, the speed limit information is generated as follows.

For example, assume that in the areas Aa, Ab, Ac, Ad, Ae, and Af having a predetermined radius with their respective weather-observing devices 3a, 3b, 3c, 3d, 3e, and 3f as centers, the areas being illustrated in FIG. 8, an area inside each area has the same weather condition. Assume that the area Aa has a precipitation amount of 40, the area Ab 50, the area Ac 100, the area Ad 30, the area Ae 20, and the area Af 70 (they are all relative values). The mine management apparatus 10 predicts areas where the road surface condition of the travel path R is bad (bad road areas) Ba and Bb based on the acquired travel path information (in this example, including data indicating the precipitation amounts in the areas Aa, Ab, Ac, Ad, Ae, and Af) and their corresponding position information.

The areas Aa, Ab, Ac, Ad, Ae, and Af may be defined as rectangular or square areas with their respective weather-observing devices 3a, 3b, 3c, 3d, 3e, and 3f as centers even if they are areas within the predetermined radius with the weather-observing devices 3a, 3b, 3c, 3d, 3e, and 3f as centers. Moreover, the travel path information transmitted from the water truck 5 to the mine management apparatus 10 includes data indicating the watering amount by the water truck 5. In other words, in step S101, the mine management apparatus 10 acquires the data indicating the watering amount and a place watered by the water truck 5 (the self-position information of the water truck 5). If a plurality of the water trucks 5 is operating, the mine management apparatus 10 acquires data indicating a plurality of watering amounts and a plurality of pieces of the self-position information.

In this example, the precipitation amounts of the areas Aa and Ab are different. However, for example, the mine management apparatus 10 creates a model where the precipitation amount changes between the two areas according to a linear function. With the use of the model, it is possible to predict the precipitation amount at a position between the areas Aa and Ab. Next, assuming that a position indicating that the precipitation amount is equal to or more than a predetermined amount is a position where the road surface condition of the travel path R is bad, the mine management apparatus 10 sets such a position as the bad road area Ba. In this manner, the mine management apparatus 10 predicts the bad road areas Ba and Bb. In other words, according to the road surface condition of the travel path R in a place close to the weather-observing device 3, the speed limit can be changed with travel path information (including data indicating a precipitation amount) acquired from a single weather-observing device 3. However, the speed limit of the travel path R can be changed in a wider area with the use of travel path information (including data indicating precipitation amounts) acquired from at least two or more weather-observing devices 3. The method for predicting the bad road areas Ba and Bb is not limited to the above method.

After the bad road areas Ba and Bb are predicted, the mine management apparatus 10 generates speed limit information for the travel paths R included in the bad road areas Ba and Bb. As described above, the speed limit information includes the information to change the speed limits to the speed limits based on the design values for the travel paths R at the mine, in other words, speed limits lower than when there is no precipitation. The mine management apparatus 10 associates the generated speed limit information with the position information (geographical information) of the travel paths R corresponding to the bad road areas Ba and Bb, and transmits the speed limit information and the position information to the vehicle control device 30 of the dump truck 20 via the management-side wireless communication device 18 and the vehicle-mounted wireless communication device 27. In other words, the mine management apparatus 10 transmits the speed limit information on the changes of the speed limits and the geographical information of the travel paths R where their speed limits need to be changed, as the operation information, to the dump truck 20 by wireless communication. When running on the travel path R where its speed limit has been changed, the vehicle control device 30, which has acquired the speed limit information, controls the dump truck 20 so as to prevent the travel speed of the dump truck 20 from exceeding the speed limit changed by the speed limit information. In the example illustrated in FIG. 8, the travel paths R where the speed limits have been changed are part of the travel path Rb included in the bad road area Ba and part of the travel paths Ra and Rc included in the bad road area Bb.

Next, in step S103, the mine management apparatus 10 wirelessly communicates with the weather-observing device 3 and acquires information on precipitation or watering (hereinafter, precipitation or the like) (for example, a precipitation amount or watering amount). If precipitation or the like is not continuing, in other words, if the weather-observing device 3 does not detect precipitation or the like (step S103, Yes), proceed to step S104. In step S104, the mine management apparatus 10 compares time t elapsed since water is stopped to be supplied to the travel path R corresponding to the generated speed limit information (elapsed time) with speed limit lifting time tc for lifting the speed limit, which is a predetermined time period. The supply of water to the travel path R includes watering by the water truck 5 in addition to the weather such as rainfall and snowfall. The lifting of the speed limit is to return a speed limit set to be lower than a reference speed limit (for example, the speed limit based on the design value for the travel path R at the mine, or a speed limit immediately before generating speed limit information for reducing a speed limit) to the "reference speed limit."

The time to start counting the elapsed time t will be described. The travel path information collection device 40 of the weather-observing device 3 acquires the time when the precipitation amount detection sensor 45A of the weather-observing device 3 no longer detects precipitation, and transmits data indicating the acquired time to the mine management apparatus 10. Accordingly, the mine management apparatus 10 can start counting the elapsed time t. Moreover, the precipitation amount detection sensor 45A of the weather-observing device 3 detects the presence or absence of rainfall at preset cycles, and transmits data indicating the presence or absence of rainfall to the mine management apparatus 10 at the cycles, and accordingly time-of-day data included in no-rainfall data obtained when the transmitted data changes from data indicating rainfall to data indicating no rainfall may be set as the time to start counting the elapsed time t. In a case of not rainfall but snowfall, if the time when the snow sensor of the precipitation amount detection sensor 45A no longer detects snowfall is acquired, it is possible to start counting the elapsed time t similarly to rainfall. With respect to the stop of the supply of water by the water truck 5, the time when watering has been stopped is acquired by a signal indicating the stop of watering detected by the flow sensor 56B, another sensor (for example, a sensor that detects a watering stop signal generated by the operator of the water truck 5 operating a watering stop button provided to the water truck 5), or the like. Data indicating the acquired time is transmitted from the water truck 5 to the mine management apparatus 10. Accordingly, the mine management apparatus 10 can start counting the elapsed time t.

If the elapsed time t reaches the speed limit lifting time tc or more (step S104, Yes), proceed to step S105. The mine management apparatus 10 generates speed limit information for returning the speed limit to the reference speed limit (a speed limit lifting step). The mine management apparatus 10 associates the generated speed limit information with the position information (geographical information) of the travel path R being a target whose speed limit is returned to the reference speed limit, and transmits the information as the operation information to the vehicle control device 30 of the dump truck 20 via the management-side wireless communication device 18 and the vehicle-mounted wireless communication device 27. During travel along the travel path R where the travel speed has been changed (returned) to the "reference speed limit," the vehicle control device 30, which has acquired the new speed limit information, controls the travel speed of the dump truck 20 so as to prevent the actual travel speed of the dump truck 20 from exceeding an upper limit being a travel speed indicated by the "reference speed limit" to which the speed limit has been changed (returned) by the speed limit information. If the dump truck 20 continues running at a speed lower than the reference speed limit on the mine property, the travel time between the load site LP and the dump site DP is extended, or the like. Accordingly, productivity at the mine decreases. Therefore, as in the embodiment, under conditions that rainfall or the like is not continuing and predetermined time (the elapsed time t) has elapsed, the speed limit of the targeted travel path R is returned to the reference speed limit and accordingly the productivity of the dump truck 20 operating on the mine property can be increased.

Next, returning to step S103, a description will be given. If rainfall or the like is continuing, in other words, if the weather-observing device 3 detects rainfall or the like (step S103, No), the road surface of the travel path R may become more slippery. In this case, the mine management apparatus 10 returns to step S101, acquires travel path information and position information from the weather-observing device 3, and newly generates (updates) speed limit information if needed.

Next, returning to step S104, a description will be given. With respect to the road surface of the travel path R, if the elapsed time t has not reached the speed limit lifting time tc (step S104, No), the moisture content of the road surface is changing to a decrease. Therefore, it is possible to predict that the travel path R will, in the future, become less slippery than the present time. In this case, the mine management apparatus 10 proceeds to step S106 and maintains the current speed limit. In other words, the mine management apparatus 10 performs a process of maintaining the current speed limit information for the targeted travel path R. Return to step S103 to execute the following procedure.

In the embodiment, as described above, when speed limit information for reducing the speed limit is generated, speed limit information for returning the speed limit to the speed limit before reduction, in other words, the reference speed limit is generated based on the elapsed time t. It is also possible to set such that the magnitude relation between the elapsed time t until returning the speed limit to the reference speed limit and the speed limit lifting time tc can be changed. In other words, in the embodiment, the length of the speed limit lifting time tc may be set in accordance with the magnitude of the precipitation amount detected by the weather-observing device 3. For example, the processing device 12 of the mine management apparatus 10 determines from travel path information transmitted from the weather-observing device 3 that the precipitation amount is increasing, changes the speed limit lifting time tc to a longer time, and set the time. The relationship between the precipitation amount and the speed limit lifting time tc is stored in advance in the storage device 13 of the mine management apparatus 10. If the precipitation amount increases, the moisture content of the travel path R also increases. The time required for the road surface to become dry after the end of precipitation is also extended. The operation control system or the operation control method that extends the speed limit lifting time tc with an increasing precipitation amount is used. Accordingly, a speed limit lower than the reference speed limit can be set until the slipperiness of the travel path R is reduced if the travel path R has a large moisture content. As a consequence, safety on the mine property is further improved.

If the speed limit information for returning the speed limit to the reference speed limit is generated, the mine management apparatus 10 may generate the speed limit information for returning the speed limit to the reference speed limit based on air temperature information including information on at least the air temperature at the mine, more specifically, the air temperature on the travel path R transmitted from the weather-observing device 3. The air temperature has an influence on the evaporation of the moisture of the travel path R. Therefore, the speed limit information for returning the speed limit to the reference speed limit is generated based on the information on the air temperature on the travel path R. Accordingly, it is possible to more appropriately evaluate the slipperiness of the travel path R and appropriately generate the speed limit information for returning the speed limit to the reference speed limit.

For example, the speed limit lifting time tc is extended as the air temperature on the travel path R drops. Consequently, until the moisture of the travel path R becomes dry and the slipperiness of the travel path R is reduced, a speed limit lower than the reference speed limit can be maintained. As a consequence, safety on the mine property is further improved. If the speed limit information for returning the speed limit to the reference speed limit is generated, the speed limit information for returning the speed limit to the reference speed limit may be generated further based on humidity information including information on the humidity at the mine, more specifically, the humidity on the travel path R. In these cases, the relationship between at least one of the air temperature and the humidity, and the speed limit lifting time tc is stored in advance in the storage device 13 of the mine management apparatus 10. In this manner, with the use of the operation control system and the operation control method that has taken into account at least one of the air temperature and the humidity, the slipperiness of the travel path R can be evaluated more appropriately. Accordingly, the speed limit information for returning the speed limit to the reference speed limit can be generated more appropriately.

Figure 9:
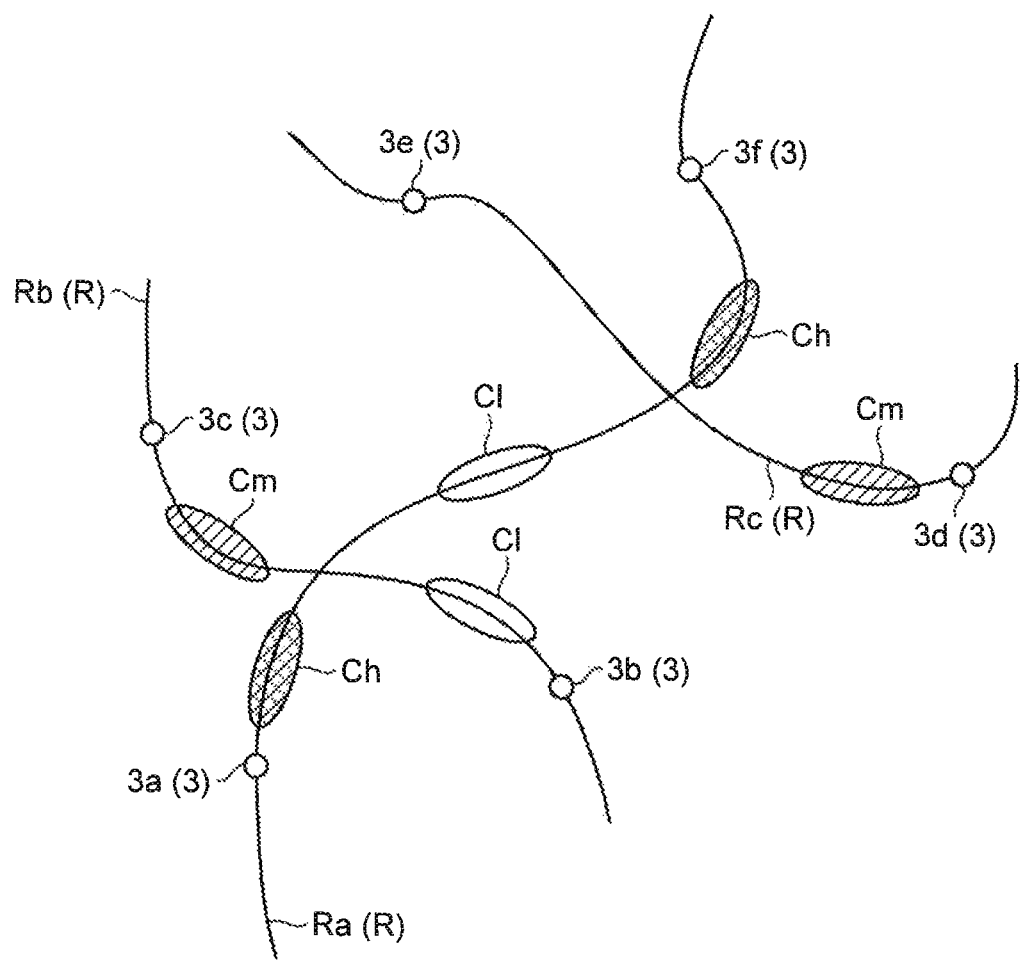
FIG. 9 is a diagram illustrating an example of a case where the watering amount of the water truck is used as travel path information in the operation control method according to the embodiment.

FIG. 9 is a diagram illustrating an example of a case where the watering amount of the water truck 5 is used as the travel path information in the operation control method according to the embodiment. The case of using the watering amount of the water truck 5 as the travel path information is also similar to the above-mentioned case of using a precipitation amount as the travel path information. In this case, the mine management apparatus 10 illustrated in FIGS. 1 and 2 acquires data indicating the watering amount as the travel path information and data indicating a watered position (the self-position information of the water truck 5) as the position information (an information acquisition step). In this example, the water truck 5, more specifically, the vehicle control device 51 included in the water truck 5 functions as one corresponding to the travel path information collection device of the weather-observing device 3. Therefore, if the water truck 5 includes a temperature sensor or a humidity sensor, data indicating the air temperature or data indicating the humidity together with the self-position information and the data indicating the watering amount are transmitted to the mine management apparatus 10. Accordingly, the speed limit of the travel path R can be changed as described above.

In the example, after the information acquisition step, speed limit change areas Ch, Cm, and Cl ranked by the watering amount are set. In other words, the speed limit change areas Ch, Cm, and Cl are respectively places that have been watered by one or a plurality of the water trucks 5. Assume that the watering amounts of the speed limit change areas Ch, Cm, and Cl decrease in the order of Ch, Cm and Cl. Therefore, the dump truck 20 becomes less slippery in the order of Ch, Cm, and Cl in the speed limit change areas Ch, Cm, and Cl. In the example, the three rankings, the speed limit change areas Ch, Cm, and Cl, are set, but ranking is not limited to this.

If the speed limit change areas Ch, Cm, and Cl are set, the mine management apparatus 10 generates speed limit information respectively for the speed limit change areas (a speed limit information generation step). In this example, it becomes less slippery in the order of the speed limit change areas Ch, Cm, and Cl. Accordingly, the speed limits are relaxed, that is, increased, in the order of the speed limit change areas Ch, Cm, and Cl. However, any of the speed limits are set to be lower than the reference speed limits that are respectively set for the speed limit change areas. Consequently, appropriate speed limit information in accordance with the moisture content of the travel path R can be generated. Accordingly, a speed limit according to the slipperiness of the travel path R can be set in more detail. As a consequence, it is possible to further improve safety on the mine property, and it is also possible to reduce the possibility of indiscriminately reducing the speed limit and suppress the reduction of productivity at the mine. The operation control method according to the embodiment may be executed setting both data indicating a precipitation amount and data indicating the watering amount of the water truck 5 as the travel path information. Consequently, more appropriate speed limit information can be generated. Therefore, it is more effective to improve safety on the mine property and suppress the tire wear of and the deterioration of the fuel consumption of the dump truck 20, and further suppress the reduction of the mine's and productivity.

Figure 10:
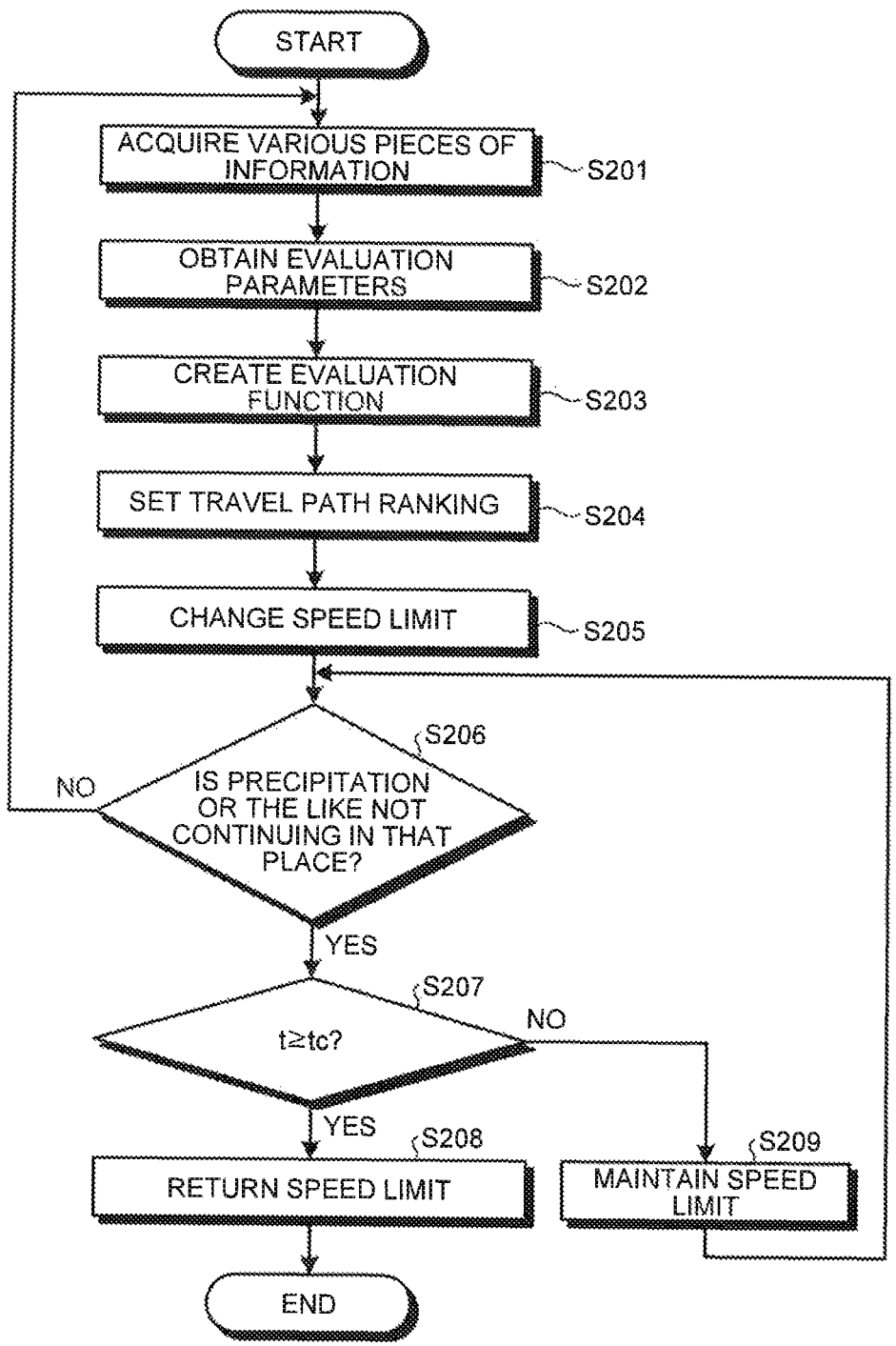
FIG. 10 is a flowchart illustrating another example of the operation control method according to the embodiment.
Figure 11:
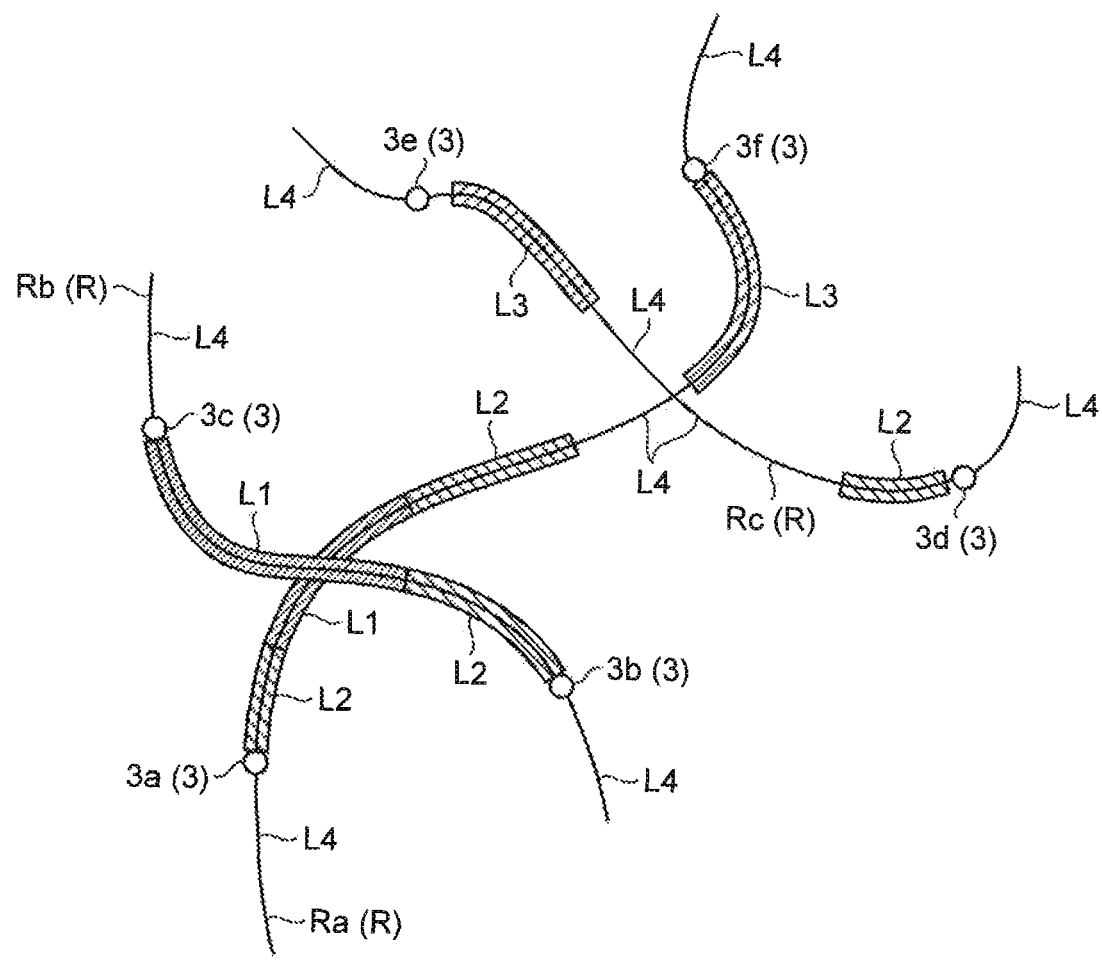
FIG. 11 is a diagram illustrating the another example of the operation control method according to the embodiment.

FIG. 10 is a flowchart illustrating another example of the operation control method according to the embodiment. FIG. 11 is a diagram illustrating the another example of the operation control method according to the embodiment. The example is similar to the above-mentioned example but is different in the respect that the mine management apparatus 10 (see FIGS. 1 and 2) as the speed limit control device sets the ranking of the road surface condition of the travel path R based on at least travel path information and posture information as information on the posture of the dump truck 20 as a mining machine, and generates speed limit information based on the set ranking.

In the operation control method of the example, firstly, the mine management apparatus 10 as the speed limit control device, more specifically, the processing device 12 (see FIG. 2) acquires various pieces of information in step S201 (an information acquisition step). Various pieces of information include travel path information acquired from the weather-observing device 3 installed at the mine, position information corresponding to the travel path information, a watering flow rate q and watering time ts of water discharged from the pump 50P, which are acquired from the water truck 5, and a slip ratio λ and a slip angle dh that are acquired from the dump truck 20. If a travel speed Vv of the dump truck 20 and a rotational speed Vw of the wheel 23 are used, the slip ratio λ can be expressed by (Vv−Vw)/Vv. The slip angle dh is obtained based on the operation information taking, as an angle, the difference between an original direction of the dump truck 20 toward which the dump truck 20 should point, and a direction toward which the dump truck 20 is pointing as a result of skidding across the road surface. In other words, an unillustrated speed sensor provided to the dump truck 20 detects the travel speed Vv, and the rotary sensor 25 further detects the rotational speed Vw. Accordingly, the slip ratio λ can be obtained. The vehicle control device 30 computes the slip ratio λ and transmits the obtained slip ratio λ to the mine management apparatus 10 via the vehicle-mounted wireless communication device 27 and the antenna 28A. The slip angle dh is obtained using the turning angle sensor 32. The slip angle dh is transmitted to the mine management apparatus 10 via the vehicle-mounted wireless communication device 27 and the antenna 28A. The travel path information acquired from the weather-observing device 3 includes a precipitation amount qw, air temperature tw, and humidity sw.

The above-mentioned operation information includes a direction toward which the dump truck 20 should move on each travel path R together with the position information of the travel path R (the geographical information of the travel path R) on which the dump truck 20 runs. The operation information is wirelessly communicated from the mine management apparatus 10 to the dump truck 20 and stored in the vehicle-mounted storage device 31 of the dump truck 20. Moreover, the turning angle sensor 32 mounted on the dump truck 20 successively detects the posture of the dump truck 20. The vehicle control device 30 compares an original direction toward which the dump truck 20 should point (corresponding to the above-mentioned direction toward which the dump truck 20 should move) based on the operation information with the direction of the dump truck 20 detected by the turning angle sensor 32, and computes the angular difference between the two. In other words, the angular difference between the two directions is the slip angle dh.

In step S202, the mine management apparatus 10 uses various pieces of information acquired in step S201 and creates evaluation parameters. In the embodiment, the evaluation parameters are a watering level parameter SP, a vehicle posture parameter Pp, and a weather parameter WP. The evaluation parameters are indicated in Equations (1) to (3). The watering level parameter SP is a scale indicating the slipperiness of the travel path R due to the water used by watering the travel path R. The vehicle posture parameter Pp is a scale indicating the slipperiness of the travel path R predicted from the posture of the dump truck 20. The weather parameter WP is a scale indicating the slipperiness of the travel path R due to the weather.

$$SP=F(q,ts) \quad (1)$$

$$Pp=G(\lambda,dh) \quad (2)$$

$$WP=H(qw,tw,sw) \quad (3)$$

In the example, each evaluation parameter indicates that the travel path R becomes slippery for the dump truck 20 as its value increases. The watering level parameter SP increases as the watering flow rate q and the watering time ts increase. The vehicle posture parameter Pp increases as the slip ratio λ and the slip angle dh increase. The weather parameter WP increases as the precipitation amount qw and humidity sw increases, and increases as the temperature tw drops.

Next, proceed to step S203. The mine management apparatus 10 assigns weights to the evaluation parameters and then creates an evaluation function FRr indicated in Equation (4). a, b, and c of Equation (4) are weighting coefficients, and their magnitudes are set in accordance with the evaluation parameters' influence on the slipperiness of the travel path R, as appropriate. For example, if rainfall continues for a long time, the water truck 5 does not perform watering. Accordingly, the weighting coefficient a of the watering level parameter SP is reduced and the weighting coefficient c of the weather parameter WP is increased.

$$FRr=J(a \times SP, b \times Pp, c \times WP) \quad (4)$$

If the evaluation function FRr is created, proceed to step S204. The mine management apparatus 10 sets a ranking L of the travel path R (a travel path ranking) based on the evaluation function FRr. In the example, as illustrated in FIG. 11, there are four travel path rankings L1, L2, L3, and L4. The travel path R becomes less slippery in the order of L1, L2, L3, and L4. As described above, the travel path R becomes slippery as the evaluation function FRr increases. In other words, the travel path R becomes less slippery as the evaluation function FRr decreases. In the example, there are four travel path rankings, but the number of the travel path rankings is not limited to four. As illustrated in FIG. 11, the travel path ranking is set in accordance with the position information of each travel path R (the geographical information of the travel path R). Accordingly, different travel path rankings may be set at different positions of one travel path R (each of Ra, Rb, and Rc).

When the travel path ranking is set based on the evaluation function FRr, proceed to step S205. In step S205, the mine management apparatus 10 executes a process of changing the speed limit for each travel path R. In other words, the mine management apparatus 10 generates speed limit information based on the travel path ranking and its corresponding position information (geographical information) (a speed limit information generation step).

In the example, it becomes less slippery in the order of the travel path rankings L1, L2, L3, and L4. Accordingly, the speed limits are also relaxed, that is, increased in the order of the travel path rankings L1, L2, L3, and L4. However, any of the speed limits are lower than the reference speed limits set for each travel path R (or each section included in each travel path R). Consequently, appropriate speed limit information in accordance with the slipperiness of the travel path R can be generated. Therefore, the speed limit of the travel path R can be set in more detail. As a consequence, it is possible to promote the suppression of the wear of tires (the wheels 23) of the dump truck 20 and the suppression of fuel consumption deterioration, and further improve safety on the mine property, and is also possible to reduce the possibility of indiscriminately reducing the speed limit and suppress the reduction of productivity at the mine.

If the speed limit information is generated, proceed to step S206. The mine management apparatus 10 wirelessly communicates with the weather-observing device 3 and acquires information on precipitation or the like and the position information of the weather-observing device 3. If the water truck 5 has performed watering here, information on watering or the like and the position information of the water truck 5 are acquired from the water truck 5. If precipitation or the like is not continuing, in other words, the weather-observing device 3 does not detect precipitation or the like in step S206 (step S206, Yes), proceed to step S207. Alternatively, if the water truck 5 is not continuing watering, in other words, the water truck 5 has stopped watering (step S206, Yes), proceed to step S207. In step S207, the mine management apparatus 10 compares the elapsed time t with the speed limit lifting time tc when the speed limit is lifted. If the elapsed time t reaches the speed limit lifting time tc or more (step S206, Yes), proceed to step S208. The mine management apparatus 10 generates speed limit information for returning the speed limit to the reference speed limit (a speed limit lifting step). The subsequent process is similar to the above-mentioned process of step S105. Moreover, the subsequent process is described assuming that a similar process is performed even if precipitation is replaced with watering by the water truck 5.

Next, returning to step S206, a description will be given. If precipitation or the like is continuing, in other words, the weather-observing device 3 detects precipitation or the like (step S206, No), the moisture content of the road surface of the relevant travel path R increases and accordingly it may become more slippery for the dump truck 20. In this case, the mine management apparatus 10 returns to step S201, acquires various pieces of information including travel path information and position information, and newly generates (updates) speed limit information if needed.

Next, returning to step S207, a description will be given. With respect to the road surface of the travel path R, if the elapsed time t has not reached the speed limit lifting time tc (step S207, No), the moisture content of the road surface is changing to a decrease. Therefore, it is possible to predict that the travel path R will, in the future, become less slippery than the present time. In this case, the mine management apparatus 10 proceeds to step S209 and maintains the current speed limit. In other words, the mine management apparatus 10 performs the process of maintaining the current speed limit information for the targeted travel path R. Return to step S206 to execute the following procedure.

As described above, the embodiment generates in advance speed limit information for changing the speed limit based on travel path information and position information. The dump truck 20 runs following the speed limit of the speed limit information. Hence, it is possible to reduce the speed limit before the occurrence of the slip (including the sideslip of the dump truck 20 itself and the spin of the wheel 23) on the dump truck 20 running on the travel path R at the mine. As a consequence, if the travel path R becomes slippery due to precipitation or the like, it is possible to prevent the dump truck 20 from skidding. Accordingly, safety on the mine property is improved, and it is possible to suppress the wear of tires (the wheels 23) of the dump truck 20 and also cut needless fuel consumption. In other words, the dump truck 20 can be prevented from skidding. Accordingly, the wear of tires (the wheels 23) can also be suppressed. Furthermore, the dump truck 20 can be prevented from skidding. Accordingly, fuel consumption deterioration due to recovery from the spin and slip of the tire (the wheel 23) can be suppressed.

Furthermore, in the embodiment, the speed limit of the travel path R is automatically changed based on travel path information including at least information on the moisture content of the travel path R, and position information. Therefore, it is possible to promote an increase in the efficiency of the operation control of the dump truck 20. Moreover, the embodiment does not need to rely on the experience and skill of an operator who controls operations if the speed limit of the travel path R is changed. Therefore, variation in operations control resulting from differences in the experience and the like of the operator who controls operations can be kept to a minimum.

Moreover, the embodiment collects a plurality of pieces of travel path information for generating speed limit information from the weather-observing devices 3 installed in a plurality of places at the mine. In this manner, speed limit information according to the plurality of places is generated using the plurality of pieces of travel path information. Therefore, speed limit information can be generated according to the installation place of the weather-observing device 3 to change the speed limit of the travel path R. Accordingly, the speed limit of the travel path R can be changed only within part of the area of the huge mine. As a consequence, even if there is precipitation or the like in part of the huge mine, there is no need to change the speed limits in the whole area of the mine. Therefore, the reduction of productivity at the mine can be kept to a minimum. Moreover, it is possible to minutely set and change a speed limit for each travel path R constructed on the huge mine property.

Moreover, the mine is huge and the road surface condition of the travel path R changes with each passing hour due to the travel of the dump truck 20 and the like, and precipitation or the like. The travel path R at the mine is generally unpaved. Accordingly, the road surface condition of the travel path R is all the more susceptible to change due to the travel of the dump truck 20 and the like, and precipitation or the like. The embodiment collects travel path information for generating speed limit information from the weather-observing devices 3 installed in the plurality of places at the mine at predetermined cycles or at predetermined timings and accordingly can give the dump truck 20 a speed limit in accordance with the road surface condition of the travel path R, the road surface condition changing with each passing hour. Hence, it is possible to improve safety during the travel of the dump truck 20, and it is possible to suppress the wear of tires of the dump truck 20, also cut needless fuel consumption, and suppress the reduction of productivity at the mine.

In the embodiment, the mine management apparatus 10 as the speed limit control device acquires travel path information from the weather-observing device 3 by wireless communication. However, the embodiment is not limited to this. For example, the mine management apparatus 10 may acquire travel path information from the weather-observing device 3 by wired communication. Moreover, in the embodiment, the driverless dump truck 20 (a driverless vehicle) is targeted as a mining machine. However, the embodiment can also be applied to a manned mining machine, in other words, a mining machine operated by an operator. In this case, it may be configured such that the speed limit control device transmits to the dump truck 20 the operation information including speed limit information based on the generated speed limit information, the dump truck 20 displays the change of the speed limit on a monitor (display device) provided in a driver's seat of the dump truck 20 in accordance with the operation information, and accordingly it is possible to urge the operator to reduce the travel speed on the targeted travel path R or notify the operator of the change of the travel speed by a speaker or the like. Moreover, it may be configured such that the speed limit control device transmits to the dump truck 20 the operation information including speed limit information based on the generated speed limit information, and even if the operator performs an operation to increase the travel speed of the dump truck 20 (for example, an acceleration operation), the dump truck 20 performs engine output limit control and braking control based on the generated speed limit information, and is caused to run so as to prevent the travel speed of the dump truck 20 from exceeding the changed speed limit.

Moreover, if the travel path R is a grade, it becomes more slippery. In the embodiment, speed limit information may be generated based on travel path information and position information so as to set a speed limit for the travel path R being a grade to be lower than a speed limit for the flat travel path R based on at least one of gradient information indicating the gradient of the travel path R at the mine and altitude information indicating altitude. Consequently, safety during the travel of the dump truck 20 is further improved.

Furthermore, in the embodiment, if speed limit information is generated for the travel path R having a factor of making the time taken to dry the water on the road surface longer than others, such as the travel path R constructed in a place at a high altitude where water tends to be accumulated, and the travel path R that is in the shade for a long time due to the influence of the terrain or season, the speed limit lifting time tc may be made longer. Consequently, the speed limit can be set to be lower than the reference speed limit during a period of time until slipperiness is reduced on the travel path R having a factor of making the time taken to dry the water on the road surface longer than others. As a consequence, safety on the mine property is improved.

The above elements include elements that can be easily assumed by those skilled in the art, and substantially the same elements. Furthermore, the elements can be combined as appropriate. Moreover, various omissions, replacements, or modifications can be made to the elements without departing from the spirit of the embodiment.

REFERENCE SIGNS LIST

1 Operation Control System for Mining Machine (Operation Control System)
3, 3a, 3b, 3c, 3d, 3e, 3f Weather-Observing Device
5 Water Truck
6 Control Facility
10 Mine Management Apparatus
12 Processing Device
13 Storage Device
15 Input/Output Unit
18 Management-Side Wireless Communication Device
20 Dump Truck
25 Rotary Sensor
26 Front Information Detection Sensor
27, 53 Vehicle-Mounted Wireless Communication Device
28A, 55A Antenna
28B, 55B GPS Antenna
29, 54 Vehicle-Mounted Position Information Detection
25 Device
30, 51 Vehicle Control Device
31, 52 Vehicle-Mounted Storage Device
32 Turning Angle Sensor
40 Travel Path Information Collection Device
41 Collection-Side Storage Device
42 Collection-Side Wireless Communication Device
43 Collection-Side Position Information Detection Device
45A Precipitation Amount Detection Sensor
45B Thermometer
45C Hygrometer
50 Watering Apparatus
56A Travel Speed Sensor
56B Flow Sensor

The invention claimed is:

1. An operation control system for a mining machine comprising, based on travel path information including at least information on moisture content of a travel path on which a mining machine operating at a mine runs, and position information being information on a position of a travel path corresponding to the travel path information, generating speed limit information for changing a speed limit for the mining machine to run on the travel path corresponding to the travel path information based on the travel path information, the position information and posture information,
wherein the posture information as the information on the posture of the mining machine includes information on a slip ratio λ or a slip angle dh.

2. The operation control system for a mining machine according to claim 1, wherein the travel path information includes information on a precipitation amount of the mine or information on a watering amount on the travel path.

3. The operation control system for a mining machine according to claim 1, wherein when speed limit information for reducing the speed limit is generated, speed limit information for returning the speed limit to the speed limit before reduction is generated based on elapsed time since water is stopped to be supplied to a travel path corresponding to the speed limit information for reducing the speed limit.

4. The operation control system for a mining machine according to claim 3, wherein the speed limit information for returning the speed limit to the speed limit before reduction is generated further based on air temperature information including at least information on air temperature at the mine.

5. The operation control system for a mining machine according to claim 1, comprising:
a plurality of travel path information collection devices, placed in a plurality of places at the mine, which collect the travel path information; and a speed limit control device which generates the speed limit information.

6. The operation control system for a mining machine according to claim 5, comprising:
a vehicle-mounted wireless communication device, mounted on the mining machine, which performs communication; and
a management-side wireless communication device, placed in a control facility at the mine, which communicates with the vehicle-mounted wireless communication device, wherein
the speed limit control device is placed in the control facility at the mine, generates the speed limit information based on the travel path information and the position information acquired via the management-side wireless communication device, and transmits the generated speed limit information via the vehicle-mounted wireless communication device to a travel control device, mounted on the mining machine, which controls a travel speed of the mining machine.

7. The operation control system for a mining machine according to claim 6, wherein
the travel path information collection device includes a collection-side wireless communication device which performs communication, and
the speed limit control device acquires the travel path information collected by the travel path information collection device via the collection-side wireless communication device and the management-side wireless communication device.

8. The operation control system for a mining machine according to claim 5, comprising a vehicle-mounted wireless communication device, mounted on the mining machine, which performs communication, wherein the speed limit control device is mounted on the mining machine, and acquires the travel path information and the position information via the vehicle-mounted wireless communication device.

9. The operation control system for a mining machine according to claim 8, wherein
the travel path information collection device includes a collection-side wireless communication device which performs communication, and
the speed limit control device acquires the travel path information collected by the travel path information collection device via the collection-side wireless communication device and the vehicle-mounted wireless communication device.

10. The operation control system for a mining machine according to claim 1, wherein
the mining machine is a driverless vehicle running based on previously acquired position information of a travel path, and
the driverless vehicle includes a travel control device which controls a travel speed on the travel path corresponding to the position information, based on speed limit information corresponding to the position information.

11. An operation control method for a mining machine comprising:
acquiring travel path information including at least information on moisture content of a travel path on which a mining machine operating at a mine runs, and position information being information on a position of the travel path corresponding to the travel path information; and
generating speed limit information for changing a speed limit for the mining machine to run on the travel path corresponding to the travel path information, based on the travel path information, the position information and posture information,
wherein the posture information as the information on the posture of the mining machine includes information on a slip ratio $\lambda$ or a slip angle dh.

12. The operation control method for a mining machine according to claim 11, wherein
a ranking of a condition of the travel path is set based on at least the travel path information and posture information as information on a posture of the mining machine, and the speed limit information is generated based on the set ranking.

13. The operation control method for a mining machine according to claim 12, wherein the travel path information includes information on a precipitation amount of the mine or information on a watering amount on the travel path.

14. The operation control method for a mining machine according to claim 11, wherein when speed limit information for reducing the speed limit is generated, speed limit information for returning the speed limit to the speed limit before reduction is generated based on elapsed time since water is stopped to be supplied to a travel path corresponding to the speed limit information for reducing the speed limit.

15. The operation control method for a mining machine according to claim 14, wherein the speed limit information for returning the speed limit to the speed limit before reduction is generated further based on air temperature information including at least information on air temperature at the mine.

16. An operation control system for a mining machine comprising, based on travel path information including at least information on moisture content of a travel path on which a mining machine operating at a mine runs, and position information being information on a position of a travel path corresponding to the travel path information, generating speed limit information for changing a speed limit for the mining machine to run on the travel path corresponding to the travel path information, based on the travel path information,
wherein the travel path information includes information on a watering amount of water used by a water truck to water the travel path.

17. The operation control system for a mining machine according to claim 16, wherein the travel path information includes information on the watering amount of the water used to water the travel path which is measured by a flow sensor provided to the water truck.

* * * * *